United States Patent
Priefert et al.

(10) Patent No.: US 11,025,191 B2
(45) Date of Patent: Jun. 1, 2021

(54) APPARATUS AND SYSTEMS FOR IMPROVED VERTICAL STRUCTURAL SUPPORTS

(71) Applicant: Priefert Mfg. Co, Inc., Mt. Pleasant, TX (US)

(72) Inventors: William Dean Priefert, Mt. Pleasant, TX (US); Rocky Christenberry, Mt. Vernon, TX (US); Tracy Metzger, Pittsburg, TX (US)

(73) Assignee: Priefert Mfg. Co, Inc., Mt. Pleasant, TX (US)

( * ) Notice: Subject to any disclaimer, the term of this patent is extended or adjusted under 35 U.S.C. 154(b) by 246 days.

(21) Appl. No.: 16/000,622

(22) Filed: Jun. 5, 2018

(65) Prior Publication Data

US 2019/0013767 A1    Jan. 10, 2019

Related U.S. Application Data

(60) Provisional application No. 62/515,343, filed on Jun. 5, 2017, provisional application No. 62/556,739, filed on Sep. 11, 2017.

(51) Int. Cl.
| | | |
|---|---|---|
| *H02S 20/00* | (2014.01) | |
| *F16M 11/22* | (2006.01) | |
| *H02S 20/10* | (2014.01) | |
| *H02S 20/32* | (2014.01) | |
| *F16M 11/06* | (2006.01) | |

(52) U.S. Cl.
CPC ............. *H02S 20/00* (2013.01); *F16M 11/22* (2013.01); *H02S 20/10* (2014.12); *H02S 20/32* (2014.12); *F16M 11/06* (2013.01)

(58) Field of Classification Search
CPC .......... H02S 20/00; H02S 20/10; H02S 20/32; F16M 11/22; F16M 11/06
See application file for complete search history.

(56) References Cited

U.S. PATENT DOCUMENTS

| | | | | |
|---|---|---|---|---|
| 3,874,035 | A * | 4/1975 | Schuplin | F16B 2/02 248/72 |
| 4,252,472 | A * | 2/1981 | Moraly | E04H 17/263 173/126 |
| 10,017,952 | B2 * | 7/2018 | Grossman | B65D 88/08 |
| 2003/0222254 | A1 | 12/2003 | Bergendahl | |
| 2006/0175510 | A1 * | 8/2006 | Pfluger | H02G 3/32 248/317 |
| 2010/0307991 | A1 | 12/2010 | Belifoll et al. | |
| 2013/0092215 | A1 | 4/2013 | Schroeder et al. | |
| 2015/0000725 | A1 | 1/2015 | Reilly et al. | |
| 2017/0005613 | A1 | 1/2017 | Yang et al. | |
| 2017/0152675 | A1 | 6/2017 | Pavey | |

FOREIGN PATENT DOCUMENTS

WO    WO 2016100357 A1    6/2016

* cited by examiner

*Primary Examiner* — Anita M King
(74) *Attorney, Agent, or Firm* — Dentons Davis Brown PC; Matthew Warner-Blankenship

(57) ABSTRACT

Disclosed herein are various methods, systems, and apparatuses relating to vertical structural supports, including acute Z-shaped piers and further including vertical structural features that provide additional structural support for various types of piers.

18 Claims, 14 Drawing Sheets

Elastic Buckling

Length 0.25 ft
Stress 217.37 ksi
P 0 k
Mx 1112 k-in
My 0 k-in
Gross Section
Local Buckling Length      1.75 ft
Stress      71.142 ksi
P           0 k
Mx          363.95 k-in
My          0 k-in
Gross Section
Local Buckling Length      12.5 ft
Stress      30.647 ksi
P           0 k
Mx          156.79 k-in
My          0 k-in
Gross Section
Local Buckling

APPARATUS AND SYSTEMS FOR IMPROVED VERTICAL STRUCTURAL SUPPORTS

CROSS-REFERENCE TO RELATED APPLICATION(S)

This application claims the benefit under 35 U.S.C. § 119(e) to U.S. Provisional Application 62/515,343, filed Jun. 5, 2017 and entitled "Apparatus, Systems, and Methods for Roll Form Solar Piers," and further to U.S. Provisional Application 62/556,739, filed Sep. 11, 2017 and entitled "Apparatus, Systems, and Methods for Roll Form Solar Piers," both which are hereby incorporated herein by reference in their entireties.

TECHNICAL FIELD

The disclosed technology relates generally to vertical structural supports, including such supports that can be used in the solar energy industry, and in particular, to the devices, methods, and design principles allowing the creation of vertical structural supports for use in cost-effective solar installations and replacement parts.

BACKGROUND

The disclosure relates to apparatus, systems and methods for providing structural supports, including structural supports for solar components.

In the solar industry, large fields 1 with hundreds of acres of solar arrays are becoming commonplace, as is shown in FIG. 1A. As a result of the increasing demand to keep the cost of electricity down, the pressure is on the industry to optimize the cost of installing these arrays.

As best shown in FIG. 1B, one of the main components of a deployed solar panel array is the vertical support structure (also referred to herein as a "post," "beam," "pier," or "pile") 10 that supports the one or more solar panels 12 and maintains such panels in their desired positions. Traditionally, the pier 10 is a structural wide flange beam 10, as best depicted in FIG. 1D.

Generally, steel structural shapes (such as steel channels, steel angles, and steel wide flange beams of various configurations) are standard shapes in the industry that can be made according to various processes, including bending, pressing, or rolling. Typically, the processes involve heating the steel and then pressing, bending, or rolling the hot billet or ingot through a set of rolls. The shapes are used in a wide variety of applications and engineers tend to use them as a "toolbox" such that they make these shapes fit to the application they are considering. As a result, structural shapes often become a "one-size-fits-all" option for the installation of solar panels.

When installing a standard wide flange beam for a solar panel or array (such as the beam 10 depicted in FIG. 1B), the typical method is to drive the pier 10 into the soil, as best shown in FIG. 1C. FIG. 1C depicts a plurality of piers 10 driven into the soil prior to installation of the solar panel arrays. This process of driving the piers 10 into the soil is typically accomplished with standard pile driving equipment such as the systems available from such companies as Vermeer (www.vermeer.com), Turchi (www.turchiusa.com), and Schletter (www.schletter.us). When preparing a site for placement of the piers 10 in such a fashion, soil conditions are often surveyed and a prescribed beam is selected based on soil conditions.

In these standard installations, once the pier 10 is driven into the soil to the desired depth as shown in FIG. 1C, there are three main measurements taken of the pier 10 to insure its stability for the solar array. A first measurement is the lateral deflection of the beam (shown by reference arrow A in FIGS. 1B and 1E), which is applied during mounting as well as by wind and other environmental forces, as would be understood. A second measurement is the axial pullout of the pier (shown by reference arrow B in FIG. 1B), which can also be applied by wind. A third measurement is the axial compression of the pier (shown by reference arrow C in FIG. 1B), which is the result of the weight of the panels 12 as well as other environmental forces, such as snow or wind.

Of these measurements, lateral deflection (reference arrow A) is typically the primary concern and governs pier sizing. It is understood that the width and depth of the pier projected against the soil as it is being loaded laterally are the major factors in determining if the pier will be able to resist an applied lateral load.

Thus, there is a need in the art for improved, cost-effective support structures, including the use of such structures for solar technologies.

BRIEF SUMMARY

Discussed herein are various devices, systems and methods relating to various improved support beam ("pier") embodiments for use in the solar industry, including certain embodiments produced using a roll forming process.

In Example 1, a vertical support structure comprises an elongate central strut, a first flange coupled to an elongate first side of the central strut, wherein a first angle between the first flange and the central strut is acute, a second flange coupled to an elongate second side of the central strut, wherein a second angle between the second flange and the central strut is acute, and a shear center disposed at a cross-sectional centerpoint of a mass of the structure.

Example 2 relates to the vertical support structure according to Example 1, further comprising an attachment feature defined in each of the first and second flanges.

Example 3 relates to the vertical support structure according to Example 2, wherein the attachment feature comprises at least one opening.

Example 4 relates to the vertical support structure according to Example 2, wherein the attachment feature is coupleable to a solar panel.

Example 5 relates to the vertical support structure according to Example 1, further comprising at least one rib defined in the elongate central strut.

Example 6 relates to the vertical support structure according to Example 1, further comprising a neutral axis disposed at the cross-sectional centerpoint and oriented in an identical direction as an expected lateral load applied to the structure.

Example 7 relates to the vertical support structure according to Example 1, wherein the first flange comprises a first angled end segment extending therefrom, and wherein the second flange comprises a second angled end segment extending therefrom.

In Example 8, a solar array support structure comprises an elongate central strut comprising at least one support structure, a first flange coupled at a first acute angle to an elongate first side of the central strut, a second flange coupled at a second acute angle to an elongate second side of the central strut, and a neutral axis disposed at a cross-sectional centerpoint of a mass of the structure and oriented in an identical direction as an expected lateral load.

Example 9 relates to the solar array support structure according to Example 8, wherein the at least one support structure comprises a rib.

Example 10 relates to the solar array support structure according to Example 8, wherein the at least one support structure comprises first and second ribs, wherein the first rib extends outward from a first surface of the elongate central strut and the second rib extends outward from a second surface of the elongate central strut.

Example 11 relates to the solar array support structure according to Example 8, wherein the central strut and the first and second flanges form a Z-shaped cross-section.

Example 12 relates to the solar array support structure according to Example 8, further comprising at least one attachment feature defined in each of the first and second flanges.

Example 13 relates to the solar array support structure according to Example 12, wherein the at least one attachment feature comprises at least one opening coupleable to a solar panel.

Example 14 relates to the solar array support structure according to Example 8, further comprising a shear center disposed at the cross-sectional centerpoint.

Example 15 relates to the solar array support structure according to Example 8, wherein the first flange comprises a first angled end segment extending therefrom, and wherein the second flange comprises a second angled end segment extending therefrom.

In Example 16, a method of making an acute Z-shaped pier comprises providing a preformed structure having an elongate central strut, a first flange coupled to an elongate first side of the central strut, and a second flange coupled to an elongate second side of the central strut. The method further comprises roll forming a first angle between the first flange and the central strut such that the first angle is acute, and roll forming a second angle between the second flange and the central strut such that the second angle is acute, wherein a shear center is disposed at a cross-sectional centerpoint of a mass of the structure.

Example 17 relates to the method according to Example 16, further comprising roll forming at least one rib in the elongate central strut.

Example 18 relates to the method according to Example 16, further comprising roll forming a first angled end segment extending from the first flange, and roll forming a second angled end segment extending from the second flange.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to improved support beam embodiments. Further embodiments relate to roll form support beams. The various support structure embodiments can be used in a number of implementations, including in the solar industry.

Amongst various processes for forming a structural shape, roll forming provides flexibility such that it allows the engineer to use her/his creativity to generate the perfect shape for the specific application it is designed for. In use, roll forming takes slit coil known as band and cold form the shape through a progressive set of specially designed rollers to achieve the shape desired.

Figure 1A:
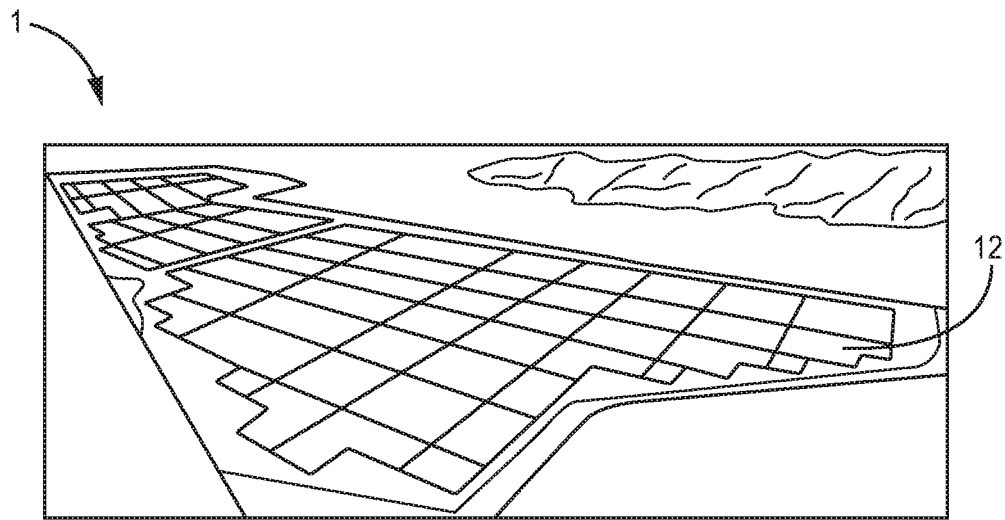
FIG. 1A depicts a perspective view of a field of known solar arrays.
Figure 1B:
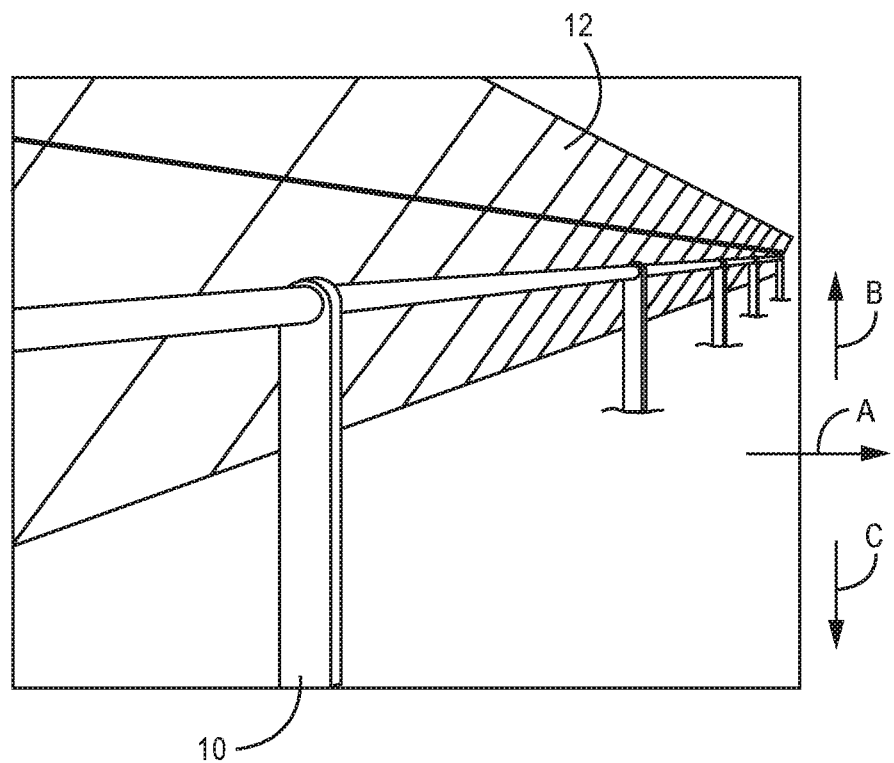
FIG. 1B is a perspective view of known wide flange beams supporting solar array panels.
Figure 1C:
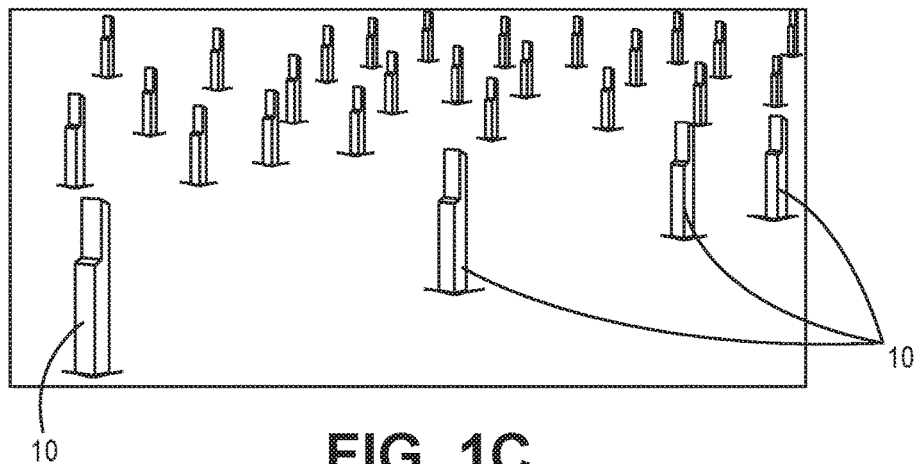
FIG. 1C is a perspective view of multiple known piers firmly positioned in the ground according to a known process prior to placement of multiple solar arrays.
Figure 1D:
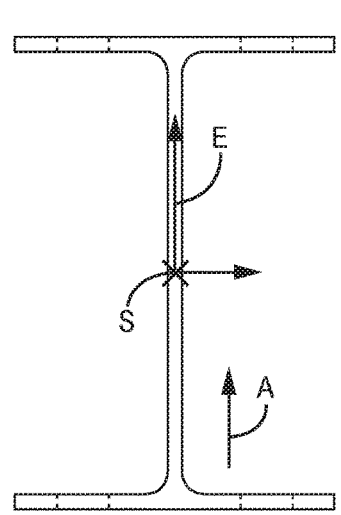
FIG. 1D is a top view of a known wide flange beam.

The various support structure embodiments disclosed herein provide an optimized shape that can achieve the 3 measurements for a solar pier (discussed below) yet reduce the amount of material used in comparison to a standard wide flange beam (such as the beam 10 as depicted in FIG. 1D), thus reducing the cost while improving the stability of the support structure. As such, certain of the embodiments disclosed or contemplated herein utilize certain shapes that can meet or exceed the advantages of the industry accepted wide flange beam shape as a solar array pier.

As discussed above, in the solar industry, large fields with tens or hundreds of acres of solar arrays are becoming commonplace, as is shown generally at 1 in FIG. 1A. As a result of the increasing demand to keep the cost of electricity down, it is important to optimize the cost of installing these arrays 1.

The various implementations of the vertical support structures 20 disclosed or contemplated herein offer an economical and improved replacement for the known wide flange beam of FIG. 1D and other known vertical support structures having different cross-sectional shapes or configurations, as discussed in further detail below. In certain implementations, these improved piers 20 have an acute angled (also referred to herein as "acute") "Z" shape, as best shown in the various embodiments depicted in FIGS. 2-4B, which are discussed in further detail below. Alternatively, the piers can have ribs that provide additional structural stability and other benefits to any of the vertical support structures, including an acute Z-shaped pier, a C-shaped configuration, as best shown in FIGS. 5A-5C, or any other known shape or configuration. The ribs are also discussed in further detail below. In a further alternative, it is understood that the vertical support structure can be any known structure for supporting one or more solar panels in an array that can meet the three requirements for a solar pier, as discussed below.

Figure 1E:
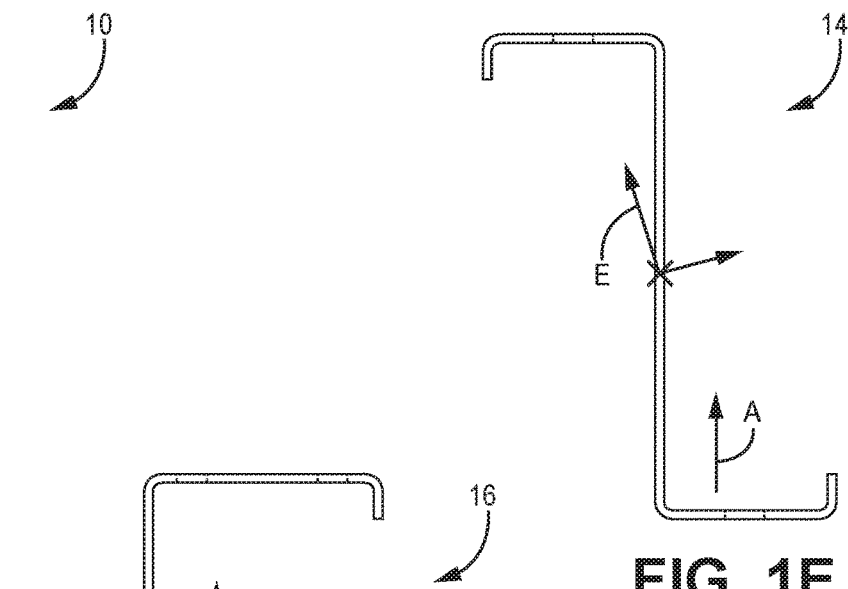
FIG. 1E is a top view of a known 90-degree Z-shaped structure.

Various known cross-sectional shapes have been used in a variety of solar and/or non-solar industrial applications, including the known wide flange beam 10 (as best shown in FIG. 1D), the known 90-degree Z shape pier 14 (as best shown in FIG. 1E), and the known C-shaped pier 16 (as best shown in FIG. 1E). The known wide flange beam 10 is currently the most commonly used pier for solar panel support, because, as shown in FIG. 1D, the shear center S of the beam 10 is located in the geographical center of the mass of the pier 10, and the principal neutral axis of the beam 10 (as represented by arrow E) is aligned to the direction that the lateral load will be applied (as shown by arrow A). These two characteristics (the location of the shear center S at the geographical center and the principal neutral axis E being aligned with the direction of the lateral load A) are advantageous, because they prevents the pier 10 from twisting when a lateral load is applied in the direction shown by arrow A (as best shown in FIGS. 1B and 1E).

Figure 1F:
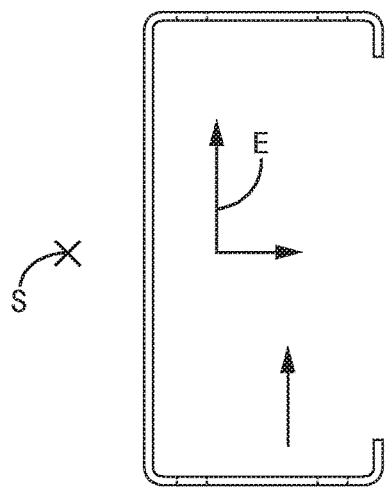
FIG. 1F is a top view of a known C-shaped structure.

In contrast, neither of the traditional 90-degree Z shape pier 14 of FIG. 1E or the known C-shaped pier 16 of FIG. 1F have both of these characteristics and thus are more prone to structural failures in the face of lateral loads. More specifically, the principal neutral axis E of the "traditional" Z shaped structure 14 as shown in FIG. 1E is rotated at an angle relative to the direction of the lateral load as represented with arrow A. This causes the known pier 14 to deflect out of the plane of loading when the lateral load is applied (as represented by arrow A), which can cause failure twisting or other mechanical failure of the pier 14. In contrast, the known C-shaped pier 16 has a shear center S that is located outside of the cross-sectional structure of the pier 16 and thus nowhere near the geographical center of the mass of the pier 16. This characteristic results in the pier 16 being subject to mechanical failure when a lateral load is applied as shown by arrow A.

Figure 2:
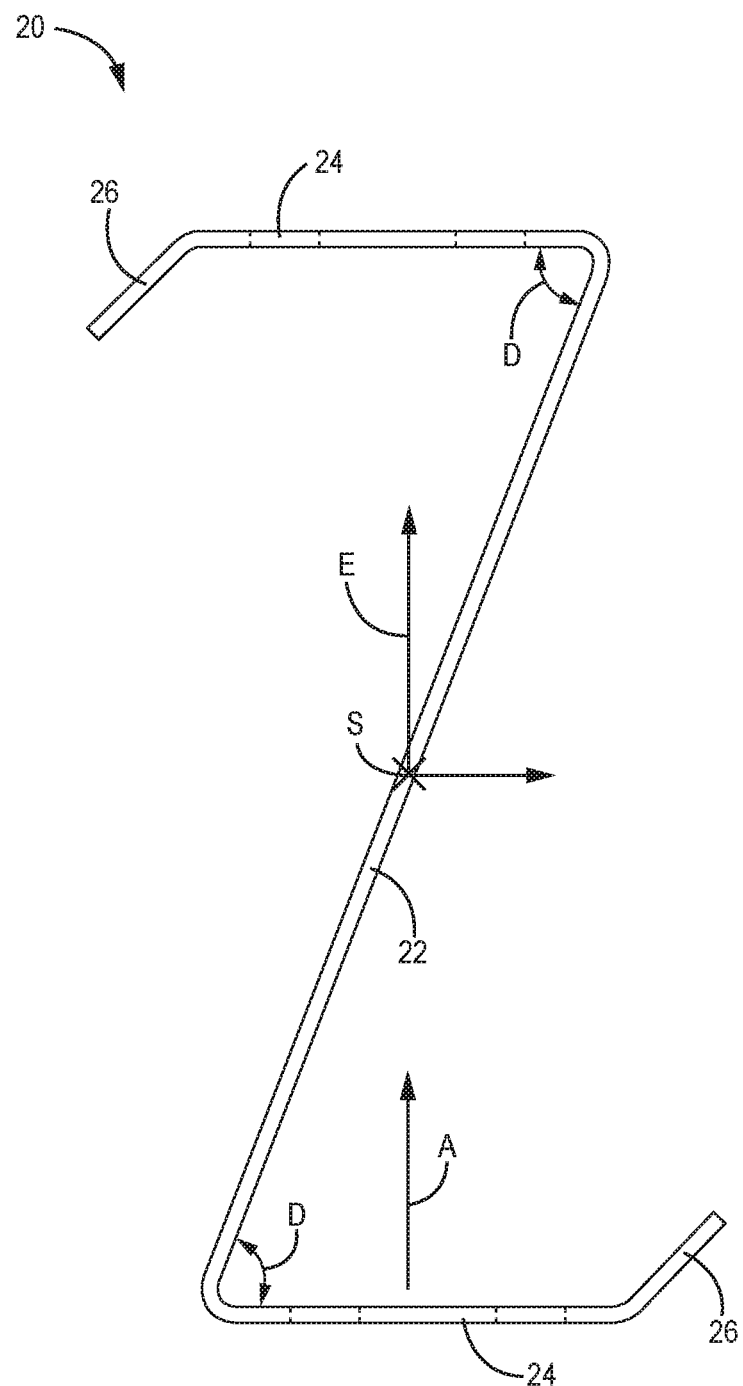
FIG. 2 is a top view of an acute angled Z-shaped support structure, according to one embodiment.

One vertical support structure that addresses these shortcomings is the acute angled Z shape vertical support structure 20 depicted in FIG. 2, according to one implementation. More specifically, the pier 20 has a cross-sectional shape that is modified from the typical 90-degree Z shape (of FIG. 1E) such that the angles D between the central support piece or strut (also known as a "web") 22 and the outer walls or wings (also known as "flanges") 24 are acute (less than 90 degrees), resulting in one embodiment in the cross-section configuration depicted in FIG. 2. Each of the flanges 24 also has an angled end segment 26, which is also referred to as a "tail" or "appendage." In this embodiment and other embodiments herein, the end segments 26 add additional structural support to the pier 20 and provide additional resistance to lateral loading. In these acute Z shaped piers 20, according to one embodiment, as best shown in FIG. 2, much like the wide flange beam 10, the principal neutral axis represented by arrow E is aligned to the direction that the lateral load will be applied (as best shown by arrow A in FIG. 2) and the shear center S of the pier 20 is located in the geographical center of the mass of the pier 20.

These implementations eliminate the out of plane deflection failures that can occur in the known 90-degree Z shape pier 14 of FIG. 1E and the C-shaped pier 16 of FIG. 1F. That is, in contrast to the known pier cross-sectional shapes discussed above, when the acute Z shape pier 20 is loaded laterally (as is shown by the arrow A in FIG. 2), the deflection only occurs in the direction of the lateral load, which reduces or eliminates the out-of-plan deflection failures. Further, in these implementations, the acute Z shape pier 20 meets or exceeds the performance of the wide flange beam in all three measurements discussed above. In further embodiments in which the acute Z shape pier 20 is formed using a roll forming process, the resulting pier 20 can have significantly less weight in comparison to a known wide flange beam by optimizing the material thickness and flange lengths to maximize the weight savings when compared to the wide flange beam.

Figure 3A:
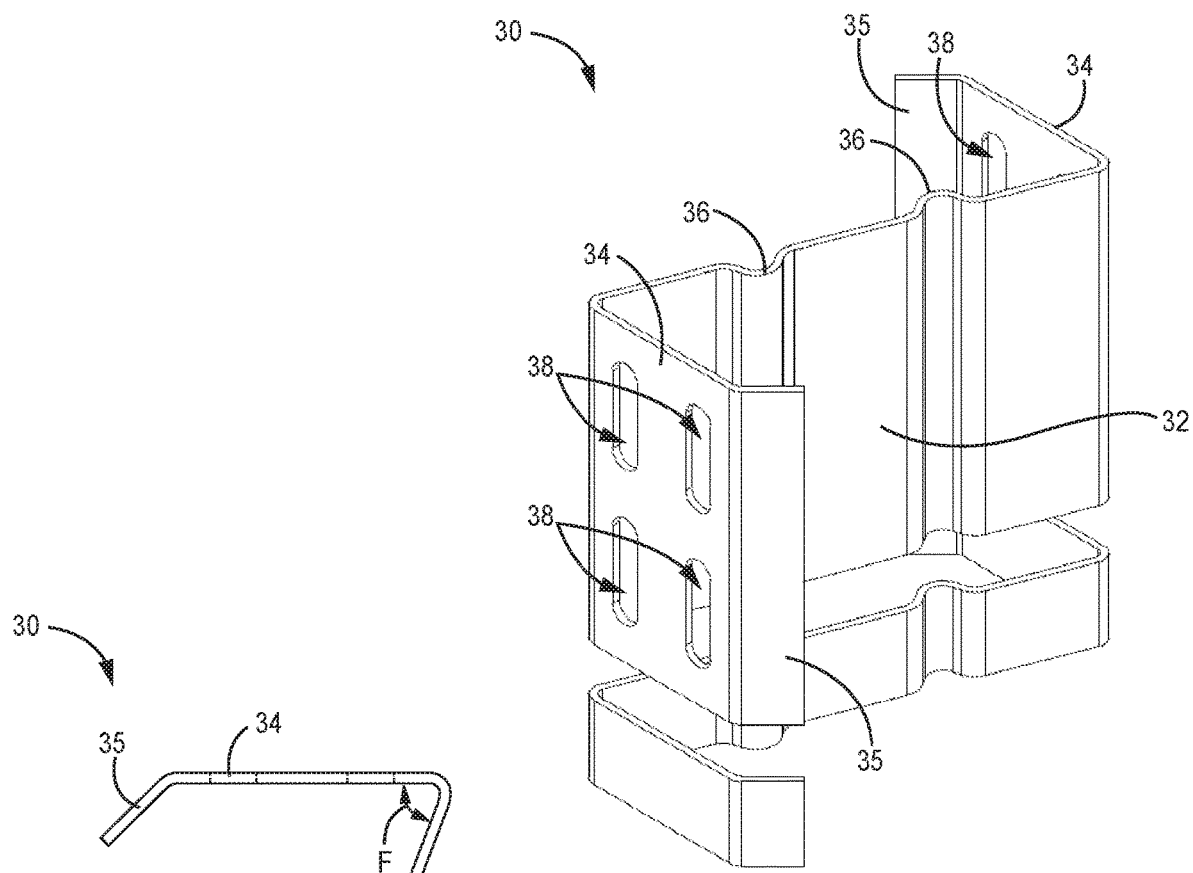
FIG. 3A is a perspective view of an acute angled Z-shaped support structure with ribs, according to one embodiment.
Figure 3B:
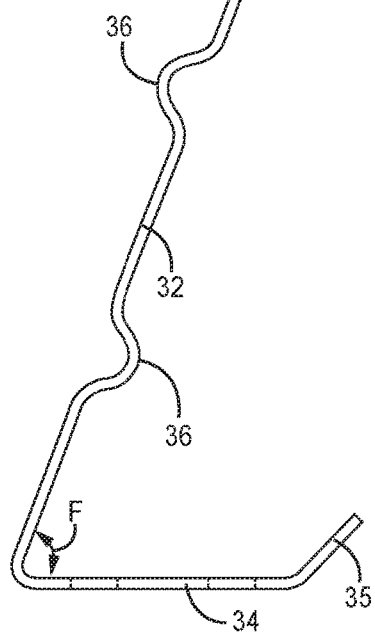
FIG. 3B is a top view of the acute angled Z-shaped support structure of FIG. 3A, according to one embodiment.
Figure 3C:
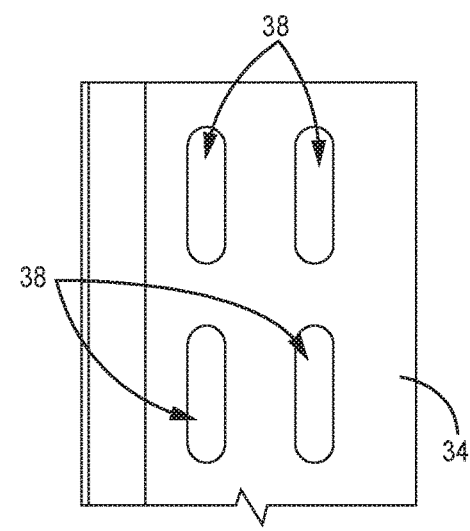
FIG. 3C is a side view of the acute angled Z-shaped support structure of FIG. 3A, according to one embodiment.

Another acute Z-shaped pier 30 embodiment is depicted in FIGS. 3A-3C, in which the pier 30 has a web 32, flanges 34, angled end segments 35, and angles F between the web 32 and the flanges 34 that are acute. In addition, in this implementation, the web 32 has structural support features (also referred to herein as "ribs") 36 defined or otherwise formed in the web 32 that extend along the entire length of the web 32. The ribs 36 can serve a variety of purposes, including, for example, providing increased structural support to the pier 30 and thereby increasing the driving ability of the pier 30.

In addition, the ribs 36 ensure that the pier 30 is not categorized as a "slender member" by the American Institute of Steel Construction ("AISC") in the AISC Steel Construction Manual Sections 16.1-14 through 16.1-18. It is understood that any pier categorized as a slender member may be subject to a decreased load capacity rating per the AISC code. The ribs 36 in this specific embodiment result in the web 32 having three straight sections with the two ribs 36 disposed between the straight sections. As such, the ribs 36 increase the width/thickness ratio of the web 32, thereby ensuring that the pier 30 is not a slender member.

Alternatively, each of the structural support features 36 defined or otherwise formed in the web 32 can be any known structural feature—such as, for example, a channel, protrusion, ridge, castellation, or offset—that provides additional structural support and/or width to the pier 30. In one embodiment as shown, the web 32 has two ribs 36. Alternatively, the web 32 can have one rib, or three or more ribs.

Further, in this implementation as best shown in FIGS. 3A and 3C, each of the flanges 34 have four holes 38 defined therein. According to one embodiment, the openings 38 can be used as attachment features for use in coupling the pier 30 to the load, such as, for example, solar panels. Alternatively, each flange 34 can have one, two, three, or five or more openings 38. In this specific embodiment, the openings 38 are ovals as shown. Alternatively, it is understood that a variety of sizes, shapes and configurations of openings 60 are possible.

Figure 4A:
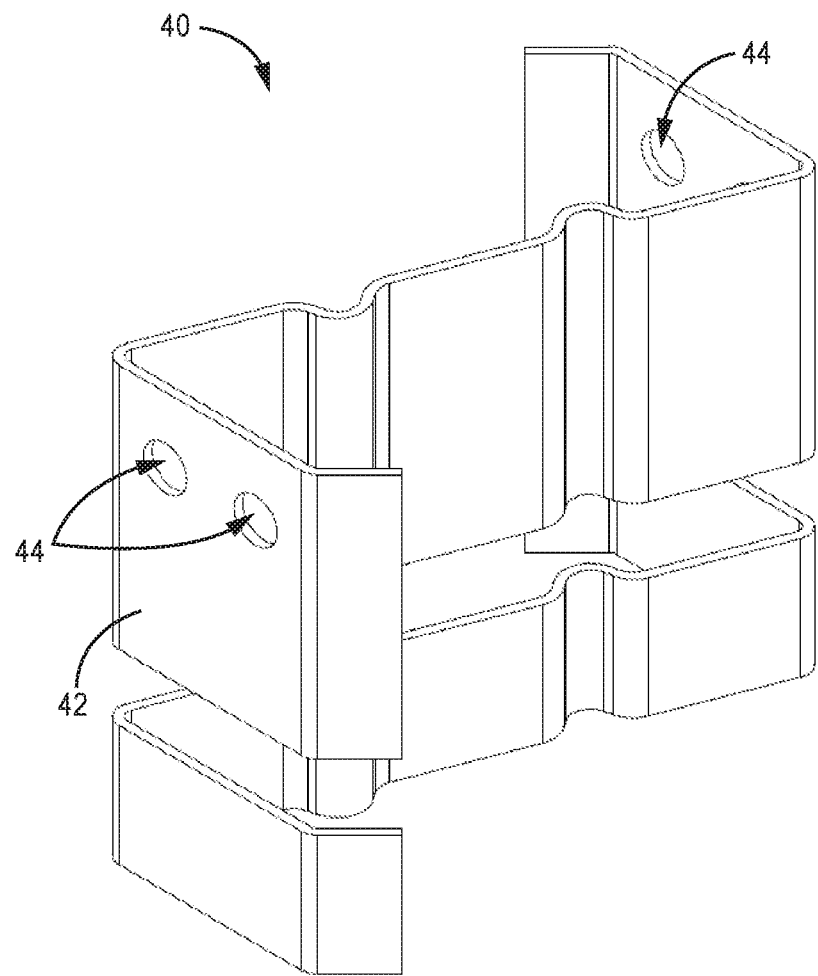
FIG. 4A is a perspective view of another acute angled Z-shaped support structure with ribs, according to a further embodiment.
Figure 4B:
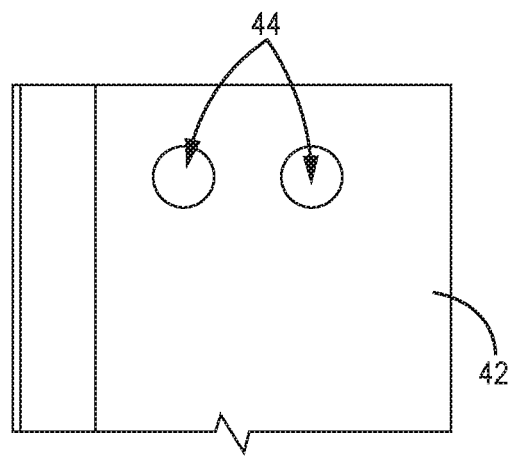
FIG. 4B is a side view of the acute angled Z-shaped support structure of FIG. 4A, according to one embodiment.
Figure 5A:
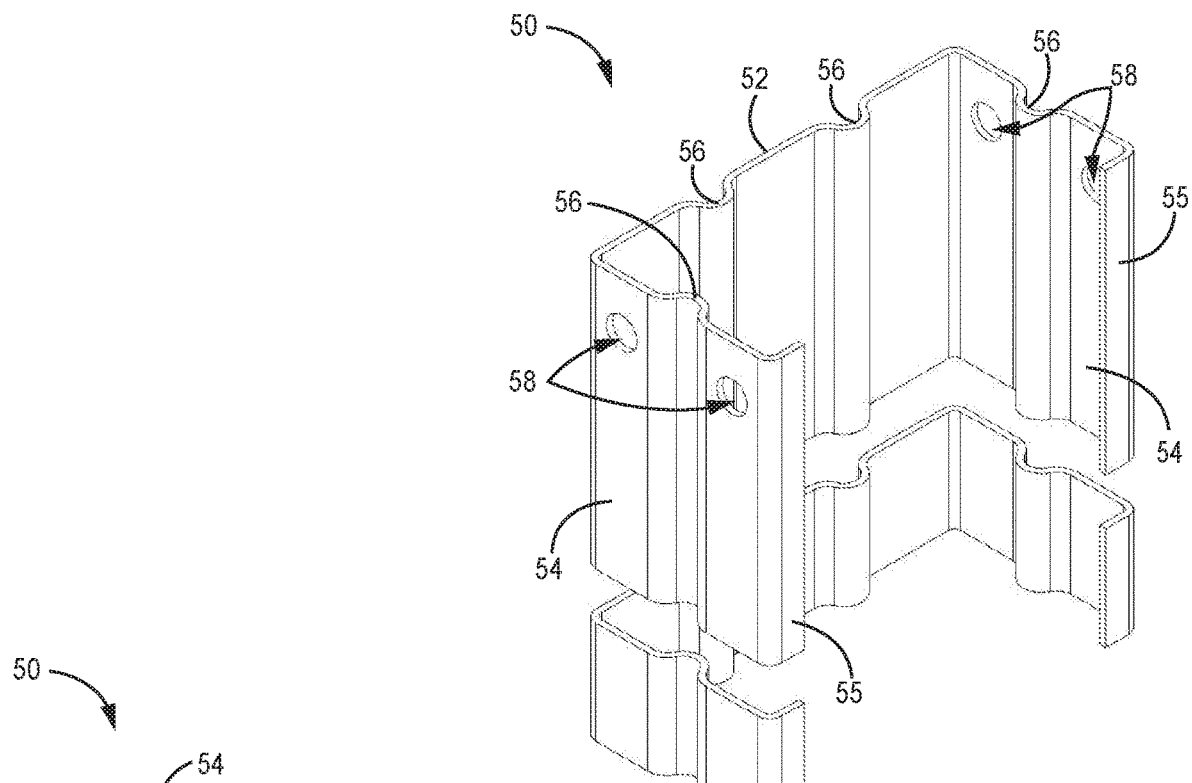
FIG. 5A is a perspective view of a C-shaped support structure, according to one embodiment.
Figure 5B:
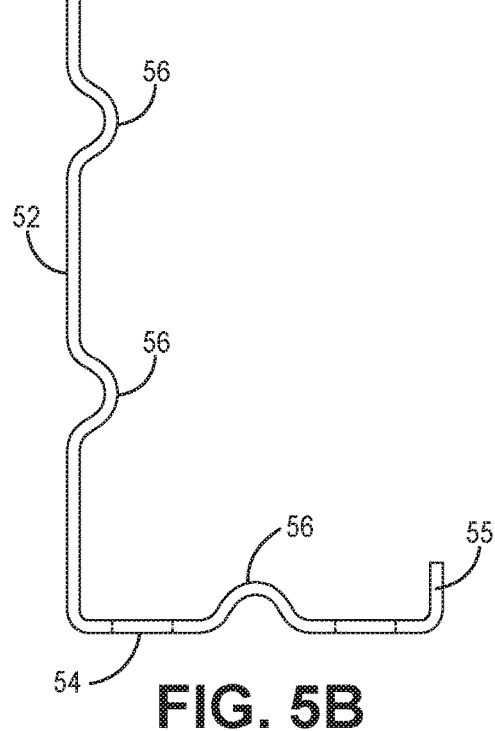
FIG. 5B is a top view of the C-shaped support structure of FIG. 5A, according to one embodiment.
Figure 5C:
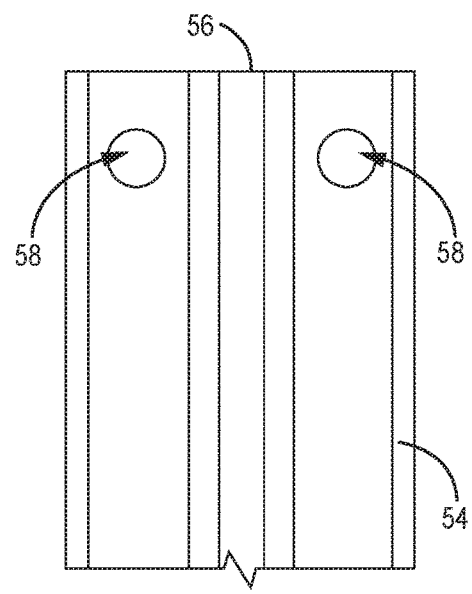
FIG. 5C is a side view of the C-shaped support structure of FIG. 5A, according to one embodiment.

One specific example of another pier 40 according to a further embodiment in which the flanges 42 have a different configuration of openings 44 is depicted in FIGS. 4A and 4B. It is understood that the pier 40 embodiment as shown has substantially the same physical components and features as the pier 30 embodiment discussed above, except for the openings 44. In this embodiment, each of the flanges 42 have two round openings 44 as shown.

Another embodiment is depicted in FIGS. 5A-5C, in which the pier 50 is a C-shaped pier 50. The pier 50 according to this implementation has a web 52, flanges 54, angled end segments 55, and ribs 56 defined or otherwise formed in the web 52 and the flanges 54 that extend along the entire length of the pier 50. Further, the flanges 54 have openings 58 defined therein as shown. In this implementation, the web 52 is attached or integral with an end of each flange 54 at a 90-degree angle to each such that the pier 50 has a C-shaped cross-section as best shown in FIG. 5B. According to one embodiment, the ribs 56 are formed or defined in the web 52 and flanges 54 such that each of the ribs 56 extend toward an interior of the pier 50 (toward the pier 50 center). In certain implementations, this configuration of the ribs 56 allows for a flat external surface of the pier 50 (with no ribs protruding therefrom), thereby allowing for the mounting or other type of attachment of other planar objects flush onto the external surface of the pier 50.

EXAMPLE

Lateral load testing was performed on six acute Z-shaped piers according to one embodiment of the invention disclosed herein and on six standard wide flange beam piers. This Example is a summary of the load testing and analysis of the comparative performance of the acute Z-shaped pier vs. the standard wide flange beam piers. sections.

The specific characteristics of the two types of piers are set forth in Table 1.

TABLE 1

Test Pier Properties

| Property | Acute Z-Shaped Pier[1] | Wide Flange Beam[2] |
|---|---|---|
| Depth (in.) | 8.00 | 5.83 |
| Width (in.) | 4.69 | 3.94 |
| Moment of Inertia (in$^4$.) | 20.5 | 14.9 |
| Section Modulus (in$^3$.) | 5.12 | 5.10 |
| Area (in$^2$.) | 2.14 | 2.52 |
| Weight (lb/ft) | 7.26 | 8.5 |
| Yield Strength (psi) | 50 | 50 |

[1]Data evaluated from CFS Property Calculation
[2]AISC Steel Construction Manual, 14$^{th}$ Ed.

A total of twelve (12) test piers (six acute Z-shaped piers and six standard wide flange piers) were installed vertically into the ground at the test area, with embedment depths of 5, 5.5 and 6 feet (two piers of each type to each depth). The piers all had at least 5 feet of reveal above grade (length of each pier above the ground). The piers were installed in one row with the strong axis aligned parallel to the row.

Pier testing was completed in substantial conformance with ASTM D3966 for lateral testing, appropriately modified for solar piers. For the lateral load tests, horizontal loads were applied to the pier at a height above ground of 5-feet, using a bearing plate that loaded the flanges equally.

Deflection was measured at two locations along the exposed portion of the pier using dial gauges. Loads were applied using a chain hoist and measured with a dynamometer, reacting against construction equipment.

Subsurface conditions at the test site were evaluated by observation of one test pit. The soil profile appeared to be brown sandy clay. No evidence of groundwater was observed.

Software Analysis of Design and Strength

Prior to load testing, the design properties and strength of the acute Z-shaped pier were evaluated using the software Cold-Formed Steel Design Software (CFS), which is commercially available from RSG Systems. The software evaluates the strength of cold-rolled steel sections, based on the American Iron and Steel Institute ("AISI") "Specification for the Design of Cold-Formed Steel Structural Members" Code.

The full section properties of the pier as determined by the CFS software are set forth in Table 2.

TABLE 2

| \multicolumn{8}{c}{Full Section Properties} |
|---|---|---|---|---|---|---|---|
| Area | 2.1353 in^2 | Wt. | 0.0072599 k/ft | Width | 16.947 in | | |
| Ix | 20.461 in^4 | rx | 3.0956 in | Ixy | −0.004 in^4 | | |
| Sx(t) | 5.1159 in^3 | y(t) | 3.9995 in | α | 0.014 deg | | |
| Sx(b) | 5.1159 in^3 | y(b) | 3.9995 in | | | | |
| | | Height | 7.9991 in | | | | |
| Iy | 2.286 in^4 | ry | 1.0347 in | xo | 0.0000 in | | |
| Sy(1) | 0.9747 in^3 | x(1) | 2.3457 in | yo | 0.0000 in | | |
| Sy(r) | 0.9747 in^3 | x(r) | 2.3457 in | jx | 0.0000 in | | |
| | | Width | 4.6913 in | jy | 0.0000 in | | |
| I1 | 20.461 in^4 | r1 | 3.0956 in | | | | |
| I2 | 2.286 in^4 | r2 | 1.0347 in | | | | |
| Ic | 22.747 in^4 | rc | 3.2639 in | Cw | 54.770 in^6 | | |
| Io | 22.747 in^4 | ro | 3.2639 in | J | 0.011300 in^4 | | |

Figure 6A:
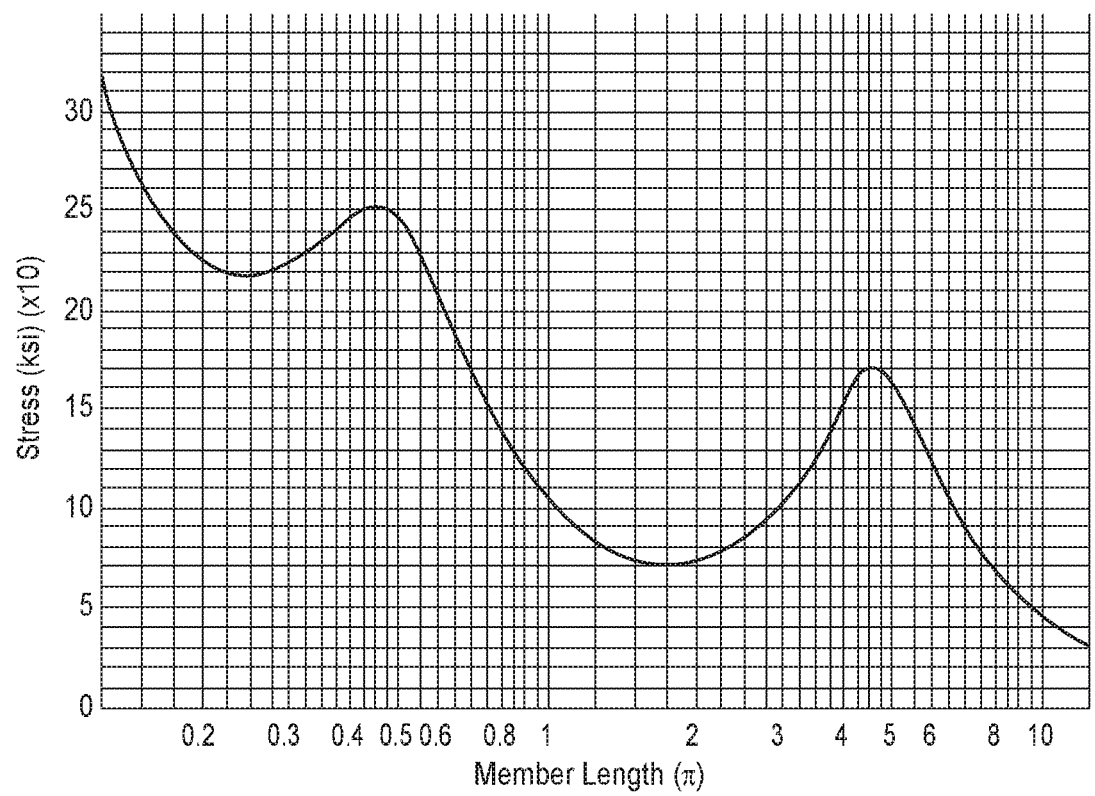
FIG. 6A is a line graph depicting the projected elastic buckling caused by lateral loading of one embodiment of the acute Z-shaped pier according to the software analysis described in the Example, according to one embodiment.
Figure 6B:
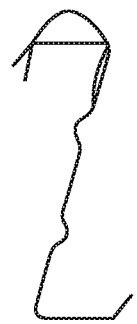
FIG. 6B is a graphical depiction—and related data—of the projected elastic buckling caused by lateral loading of one embodiment of the acute Z-shaped pier according to the software analysis described in the Example, according to one embodiment.
Figure 6C:
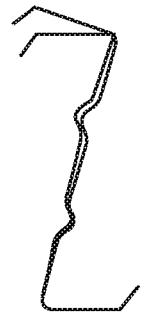
FIG. 6C is a graphical depiction—and related data—of the projected elastic buckling caused by lateral loading of one embodiment of the acute Z-shaped pier according to the software analysis described in the Example, according to one embodiment.
Figure 6D:
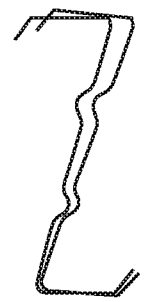
FIG. 6D is a graphical depiction—and related data—of the projected elastic buckling caused by lateral loading of one embodiment of the acute Z-shaped pier according to the software analysis described in the Example, according to one embodiment.
Figure 7A:
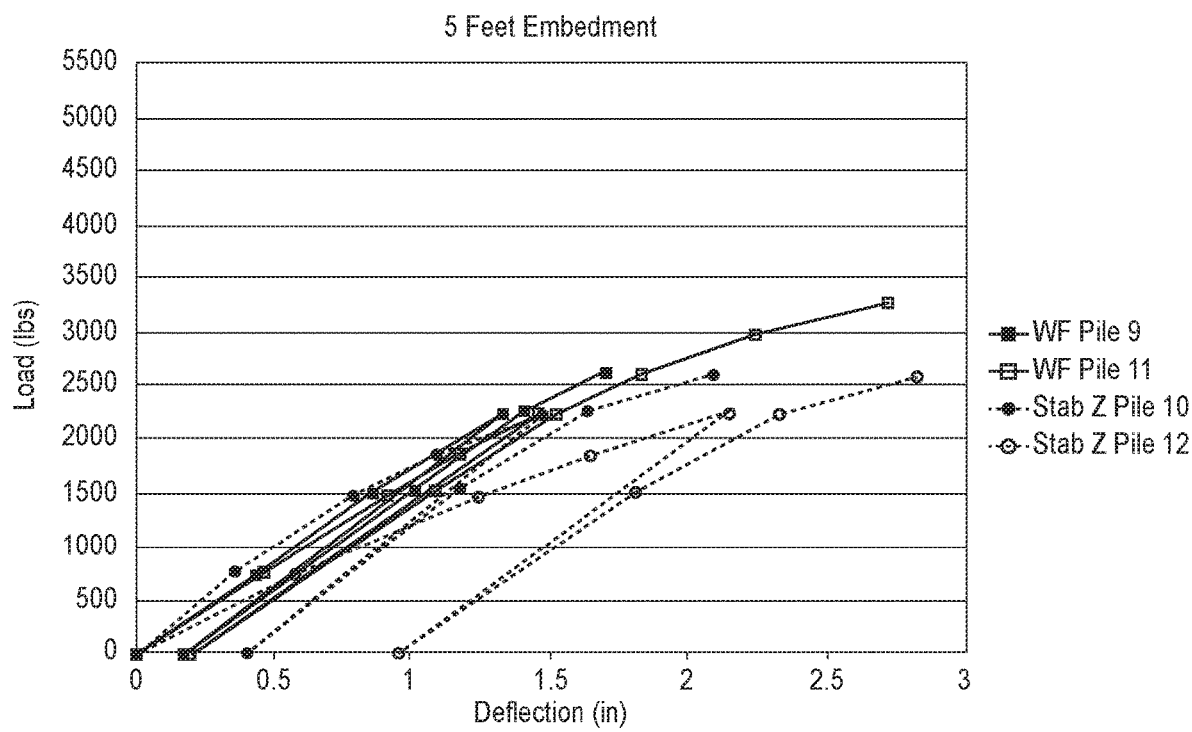
FIG. 7A is a line graph depicting the lateral deflection of the test piers at 5 feet embedment in the Example, according to one embodiment.
Figure 7B:
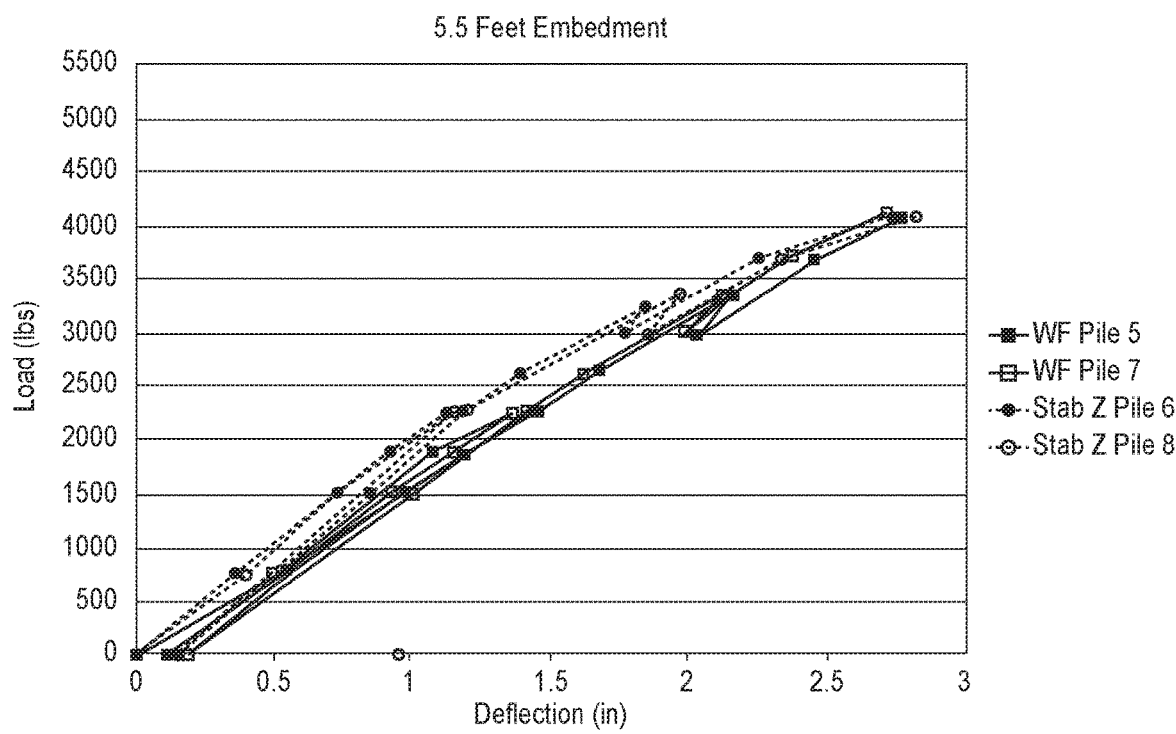
FIG. 7B is a line graph depicting the lateral deflection of the test piers at 5.5 feet embedment in the Example, according to one embodiment.
Figure 7C:
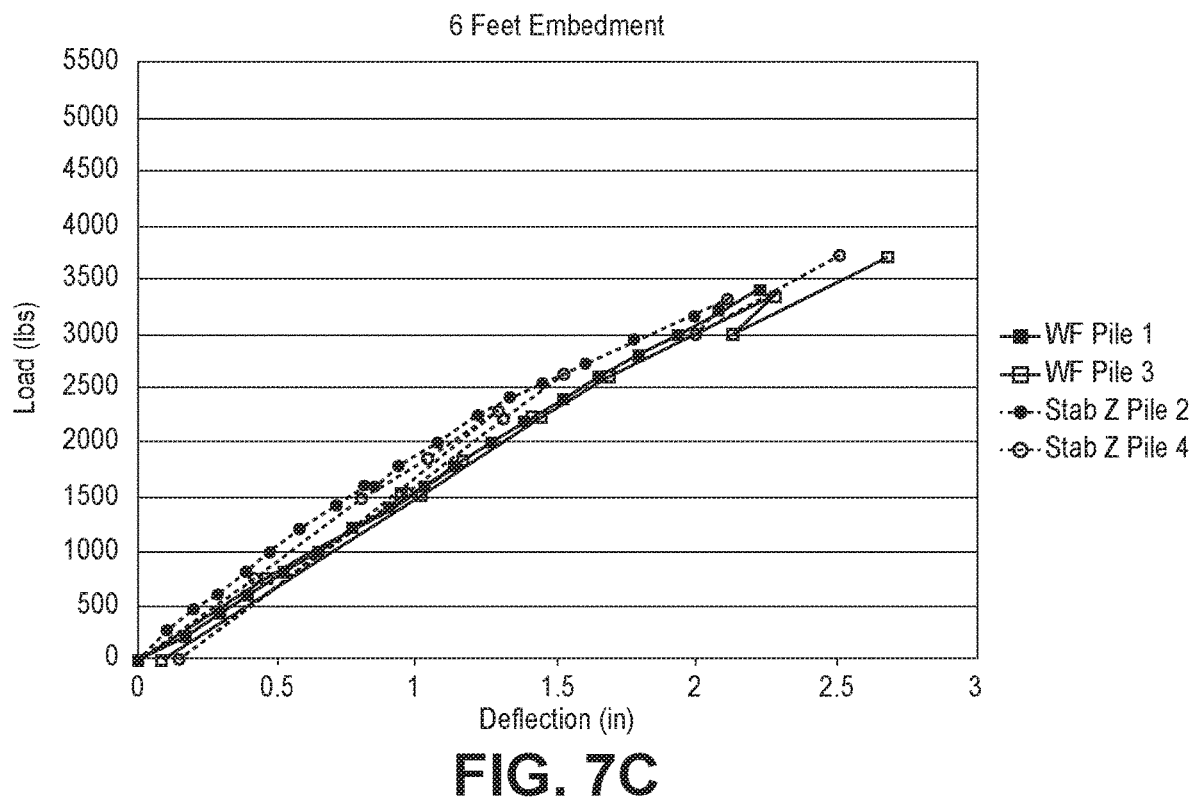
FIG. 7C is a line graph depicting the lateral deflection of the test piers at 5 feet embedment in the Example, according to one embodiment.

In addition, the buckling characteristics of the acute Z-shaped pier as determined by the CFS software are set forth in FIGS. 6A-6D. More specifically, the software analyzes the properties of the pier and projects the buckling that might occur as a result of lateral loading of that pier. FIG. 6B schematically depicts the projected local buckling (with related statistics provided as well) of one embodiment of the Z-shaped pier such that one flange of the pier buckles outward. It should be noted that this specific type of physical failure did occur in the load testing of actual piers discussed below. FIG. 6C schematically depicts the projected local buckling (with related statistics) of one embodiment such that one angle of a flange buckles outward. Finally, FIG. 6D schematically depicts the projected distortional buckling (with related statistics) of one embodiment such that the entire member fails.

Based on these values and considering the application of lateral load at 60-inches above grade, it was anticipated that yield of the pile could occur at horizontal loads of approximately 4,260 pounds.

Lateral Pier Load Testing

The results of the lateral pile load testing are presented in FIGS. 7A-8L and further in Tables _____ as set forth below. The results relating to the acute Z-shaped pier under lateral load were well predicted by the CFS Software.

Figure 8A:
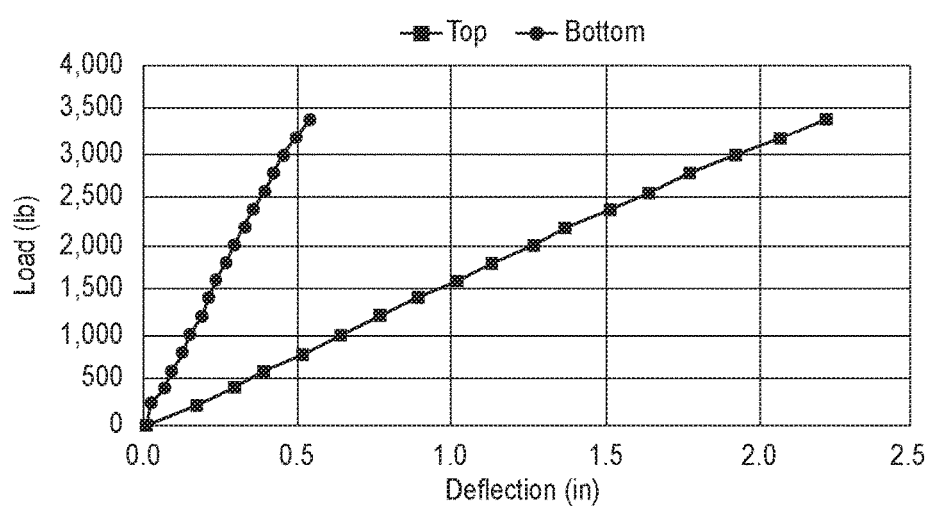
FIG. 8A is a line graph depicting the lateral deflection of Pier 1 in the load testing of the Example, according to one embodiment.

Table 3 below sets forth the results of the lateral load test of Pier 1, which was a standard wide flange pier driven to a depth of 6 feet. Further, FIG. 8A depicts a line graph showing the deflection of Pier 1.

TABLE 3

| \multicolumn{5}{c}{Lateral Load Test - Pier 1} |
|---|---|---|---|---|
| Pile Number: | | 1 | Tested by: PR | |
| Ground surface Condition: | | Grass | Pile Size: Wide Flange Beam | |
| Height of top of pile from ground surface | | | 62 in | |
| Height of pull chain above ground surface | | | 62 in | |
| Height of top measurement | | | 60.75 in | |
| Height of bottom measurement | | | 6 in | |
| Pile Driven Depth | | | 6 ft | |

| | \multicolumn{4}{c}{STABILIZED READING} |
|---|---|---|---|---|
| LOAD (lbs) | Top of Pile Reading | Top of Pile Detection | Bottom of Pile Reading | Bottom of Pile Detection |
| 0 | 1.984 | 0.000 | 1.532 | 0.000 |
| 230 | 2.156 | 0.172 | 1.557 | 0.025 |
| 430 | 2.280 | 0.296 | 1.606 | 0.074 |
| 590 | 2.375 | 0.391 | 1.621 | 0.089 |
| 800 | 2.507 | 0.523 | 1.660 | 0.128 |
| 1000 | 2.625 | 0.641 | 1.680 | 0.148 |
| 1210 | 2.750 | 0.766 | 1.720 | 0.188 |
| 1410 | 2.873 | 0.889 | 1.745 | 0.213 |
| 1610 | 3.008 | 1.024 | 1.766 | 0.234 |
| 1800 | 3.118 | 1.132 | 1.799 | 0.267 |
| 2000 | 3.252 | 1.268 | 1.830 | 0.298 |
| 2200 | 3.358 | 1.374 | 1.861 | 0.329 |
| 2400 | 3.504 | 1.520 | 1.894 | 0.362 |
| 2600 | 3.631 | 1.647 | 1.931 | 0.399 |
| 2800 | 3.768 | 1.784 | 1.956 | 0.424 |
| 3000 | 3.911 | 1.927 | 1.988 | 0.456 |
| 3200 | 4.059 | 2.075 | 2.032 | 0.500 |
| 3400 | 4.207 | 2.223 | 2.075 | 0.543 |
| ~3600 | Failure | | | |

Figure 8B:
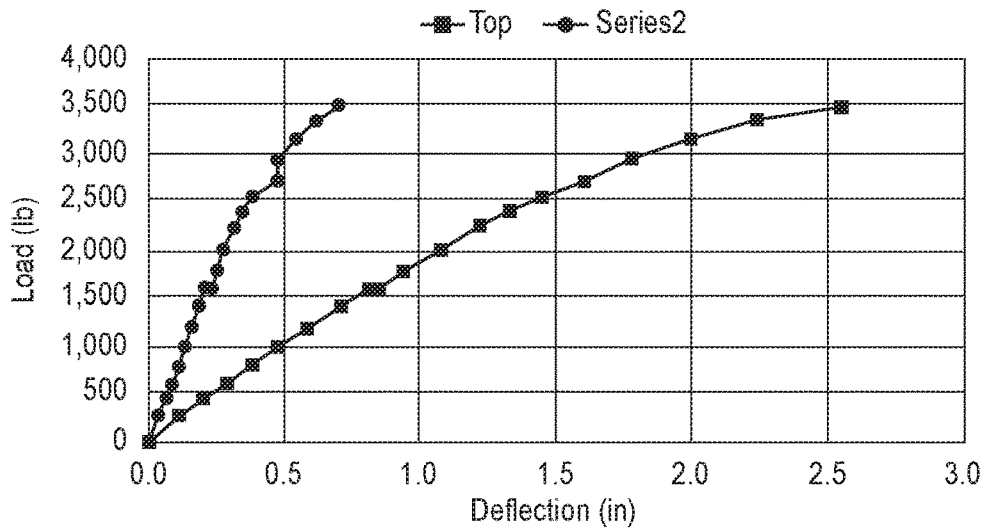
FIG. 8B is a line graph depicting the lateral deflection of Pier 2 in the load testing of the Example, according to one embodiment.

Table 4 below sets forth the results of the lateral load test of Pier 2, which was an acute Z-shaped pier driven to a depth of 6 feet. Further, FIG. 8B depicts a line graph showing the deflection of Pier 2.

TABLE 4

Lateral Load Test - Pier 2

| Pile Number: | 2 | Tested by: PR |
|---|---|---|
| Ground surface Condition: | PV Pile Lateral Load 1 | Pile Size: Stabilized Z |
| Haight of top of pile from ground surface | | 61.75 in |
| Height of pull chain above ground surface | | 61.75 in |
| Height of top measurement | | 60.75 in |
| Height of bottom measurement | | 6 in |
| Pile Driven Depth | | 6 t |

STABILIZED READING

| LOAD (lbs) | Top of Pile Reading | Top of Pile Detection | Bottom of Pile Reading | Bottom of Pile Detection |
|---|---|---|---|---|
| 0 | 1.999 | 0.000 | 0.883 | 0.000 |
| 280 | 2.109 | 0.110 | 0.921 | 0.038 |
| 460 | 2.198 | 0.199 | 0.946 | 0.063 |
| 600 | 2.286 | 0.287 | 0.970 | 0.087 |
| 800 | 2.387 | 0.388 | 0.990 | 0.107 |
| 990 | 2.472 | 0.473 | 1.015 | 0.132 |
| 1200 | 2.581 | 0.582 | 1.041 | 0.158 |
| 1420 | 2.712 | 0.713 | 1.072 | 0.189 |
| 1600 | 2.812 | 0.813 | 1.095 | 0.212 |
| 1590 | 2.848 | 0.849 | 1.120 | 0.237 |
| 1790 | 2.932 | 0.933 | 1.131 | 0.248 |
| 2000 | 3.075 | 1.076 | 1.166 | 0.283 |
| 2240 | 3.216 | 1.217 | 1.200 | 0.317 |
| 2400 | 3.331 | 1.332 | 1.235 | 0.352 |
| 2540 | 3.445 | 1.446 | 1.272 | 0.389 |
| 2720 | 3.598 | 1.599 | 1.361 | 0.478 |
| 2950 | 3.769 | 1.770 | 1.358 | 0.475 |
| 3150 | 3.988 | 1.989 | 1.431 | 0.548 |
| 3360 | 4.235 | 2.236 | 1.501 | 0.618 |
| 3500 | 4.545 | 2.546 | 1.585 | 0.702 |
| ~3600 | Failure, Pile Buckled | | | |

Figure 8C:
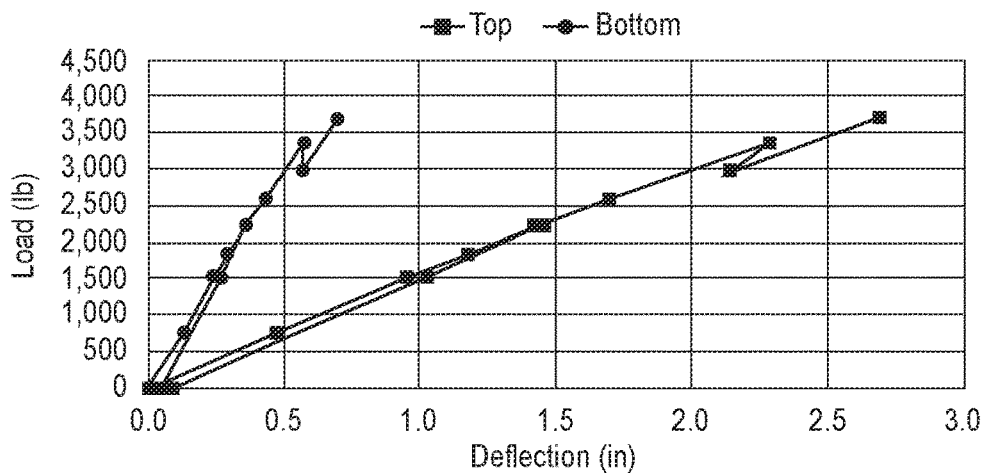
FIG. 8C is a line graph depicting the lateral deflection of Pier 3 in the load testing of the Example, according to one embodiment.

Table 5 below sets forth the results of the lateral load test of Pier 3, which was a standard wide flange pier driven to a depth of 6 feet. Further, FIG. 8C depicts a line graph showing the deflection of Pier 3.

TABLE 5

Lateral Load Test - Pier 3

| Pile Number: | 3 | Tested by: PR |
|---|---|---|
| Ground surface Condition: | Grass | Pile Size: Wide Flange Beam |
| Height of top of pile from ground surface | | 61 in |
| Height of pull chain above ground surface | | 61 in |
| Height of top measurement | | 60.75 in |
| Height of bottom measurement | | 6 in |
| Pile Driven Depth | | 6 ft |

STABILIZED READING

| LOAD (lbs) | Top of Pile Reading | Top of Pile Detection | Bottom of Pile Reading | Bottom of Pile Detection |
|---|---|---|---|---|
| 0 | 2.432 | 0.000 | 0.969 | 0.000 |
| 750 | 2.893 | 0.461 | 1.092 | 0.123 |
| 1520 | 3.374 | 0.942 | 1.198 | 0.229 |
| 1840 | 3.594 | 1.162 | 1.248 | 0.279 |
| 2230 | 3.839 | 1.407 | 1.313 | 0.344 |
| 0 | 2.517 | 0.085 | 1.010 | 0.041 |
| 1510 | 3.449 | 1.017 | 1.229 | 0.260 |
| 2240 | 3.878 | 1.446 | 1.330 | 0.361 |

TABLE 5-continued

| Lateral Load Test - Pier 3 | | | | |
|---|---|---|---|---|
| 2600 | 4.115 | 1.683 | 1.393 | 0.424 |
| 3360 | 4.711 | 2.279 | 1.539 | 0.570 |
| 2990 | 4.562 | 2.130 | 1.524 | 0.555 |
| 3700 | 5.111 | 2.679 | 1.658 | 0.689 |
| 4125 | Failure | | | |

Figure 8D:
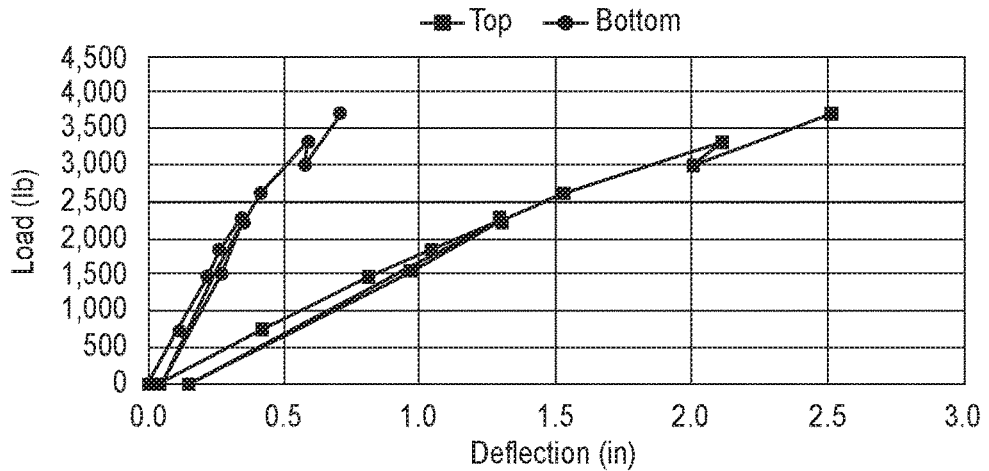
FIG. 8D is a line graph depicting the lateral deflection of Pier 4 in the load testing of the Example, according to one embodiment.

Table 6 below sets forth the results of the lateral load test of Pier 4, which was an acute Z-shaped pier driven to a depth of 6 feet. Further, FIG. 8D depicts a line graph showing the deflection of Pier 4.

TABLE 6

Lateral Load Test - Pier 4

| Pile Number: | 4 | Tested by: PR | |
|---|---|---|---|
| Ground surface Condition: | Grass | Pile Size: Stabilized Z | |
| Height of top of pile from ground surface | | | 62 in |
| Height of pull chain above ground surface | | | 62 in |
| Height of top measurement | | | 60.75 in |
| Height of bottom measurement | | | 6 in |
| Pile Driven Depth | | | 6 t |

| | STABILIZED READING | | | |
|---|---|---|---|---|
| LOAD (lbs) | Top of Pile Reading | Top of Pile Detection | Bottom of Pile Reading | Bottom of Pile Detection |
| 0 | 2.479 | 0.000 | 1.032 | 0.000 |
| 750 | 2.894 | 0.415 | 1.141 | 0.109 |

TABLE 6-continued

| Lateral Load Test - Pier 4 | | | | |
|---|---|---|---|---|
| 1480 | 3.282 | 0.803 | 1.250 | 0.218 |
| 1860 | 3.517 | 1.038 | 1.297 | 0.265 |
| 2290 | 3.771 | 1.292 | 1.374 | 0.342 |
| 0 | 2.630 | 0.151 | 1.081 | 0.049 |
| 1550 | 3.441 | 0.962 | 1.298 | 0.266 |
| 2230 | 3.779 | 1.300 | 1.384 | 0.352 |
| 2620 | 4.003 | 1.524 | 1.443 | 0.411 |
| 3320 | 4.586 | 2.107 | 1.623 | 0.591 |
| 3000 | 4.476 | 1.997 | 1.602 | 0.570 |
| 3720 | 4.989 | 2.510 | 1.736 | 0.704 |
| 4125 | Failure | | | |

Figure 8E:
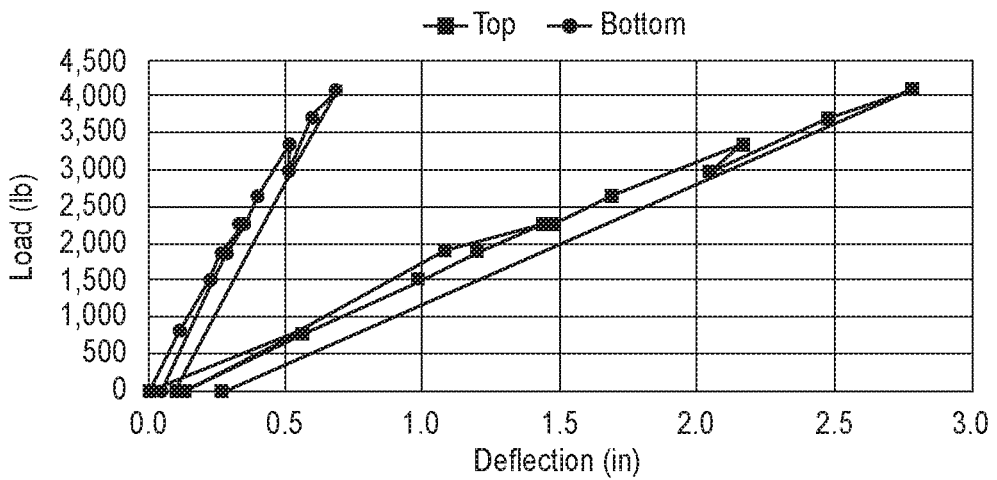
FIG. 8E is a line graph depicting the lateral deflection of Pier 5 in the load testing of the Example, according to one embodiment.

Table 7 below sets forth the results of the lateral load test of Pier 5, which was a standard wide flange pier driven to a depth of 5.5 feet. Further, FIG. 8E depicts a line graph showing the deflection of Pier 5.

TABLE 7

Lateral Load Test - Pier 5

| Pile Number: | 5 | Tested by: PR | |
|---|---|---|---|
| Ground surface Condition: | Grass | Pile Size: Wide Flange Beam | |
| Height of top of pile from ground surface | | | 61.5 in |
| Haight of pull chain above ground surface | | | 61.5 in |
| Haight of top measurement | | | 60.75 in |
| Height of bottom measurement | | | 8 in |
| Pile Driven Depth | | | 5.5 ft |

| | STABILIZED READING | | | |
|---|---|---|---|---|
| LOAD (lbs) | Top of Pile Reading | Top of Pile Detection | Bottom of Pile Reading | Bottom of Pile Detection |
| 0 | 1.614 | 0.000 | 2.718 | 0.000 |
| 790 | 2.159 | 0.545 | 2.827 | 0.109 |
| 1520 | 2.591 | 0.977 | 2.930 | 0.212 |
| 1870 | 2.804 | 1.190 | 2.977 | 0.259 |
| 2260 | 3.041 | 1.427 | 3.037 | 0.319 |
| 0 | 1.730 | 0.116 | 2.755 | 0.037 |
| 1890 | 2.681 | 1.067 | 2.990 | 0.272 |
| 2260 | 3.072 | 1.458 | 3.056 | 0.338 |
| 2640 | 3.288 | 1.674 | 3.102 | 0.384 |
| 3350 | 3.771 | 2.157 | 3.225 | 0.507 |
| 2990 | 3.648 | 2.034 | 3.219 | 0.501 |
| 3700 | 4.073 | 2.459 | 3.304 | 0.586 |
| 4100 | 4.388 | 2.774 | 3.389 | 0.671 |
| 0 | 1.870 | 0.256 | 2.806 | 0.088 |

Figure 8F:
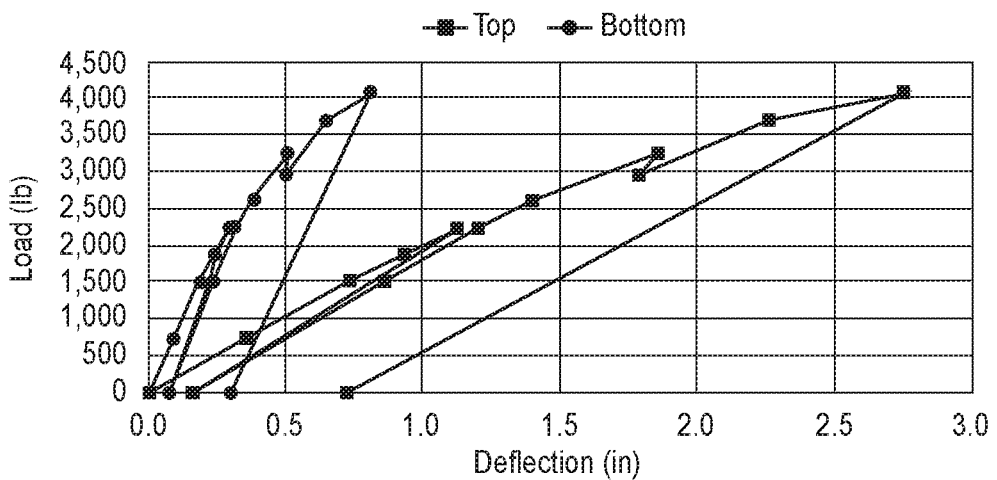
FIG. 8F is a line graph depicting the lateral deflection of Pier 6 in the load testing of the Example, according to one embodiment.

Table 8 below sets forth the results of the lateral load test of Pier 6, which was an acute Z-shaped pier driven to a depth of 5.5 feet. Further, FIG. 8F depicts a line graph showing the deflection of Pier 6.

TABLE 8

Lateral Load Test - Pier 6

| Pile Number: | | 6 | Tested by: PR | |
|---|---|---|---|---|
| Ground surface Condition: | | Grass | Pile Size: Stabilized Z | |
| Height of top of pile from ground surface | | | 62 in | |
| Height of pull chain above ground surface | | | 62 in | |
| Height of top measurement | | | 60.75 in | |
| Height of bottom measurement | | | 6 in | |
| Pile Driven Depth | | | 5.5 ft | |

STABILIZED READING

| LOAD (lbs) | Top of Pile Reading | Top of Pile Detection | Bottom of Pile Reading | Bottom of Pile Detection |
|---|---|---|---|---|
| 0 | 1.776 | 0.000 | 1.053 | 0.000 |
| 750 | 2.127 | 0.351 | 1.138 | 0.085 |
| 1520 | 2.505 | 0.729 | 1.238 | 0.185 |
| 1890 | 2.699 | 0.923 | 1.284 | 0.231 |
| 2250 | 2.897 | 1.121 | 1.335 | 0.282 |
| 0 | 1.929 | 0.153 | 1.123 | 0.070 |
| 1520 | 2.621 | 0.845 | 1.282 | 0.229 |
| 2270 | 2.963 | 1.187 | 1.364 | 0.311 |
| 2630 | 3.167 | 1.391 | 1.424 | 0.371 |
| 3250 | 3.624 | 1.843 | 1.557 | 0.504 |
| 2990 | 3.552 | 1.776 | 1.545 | 0.492 |
| 3700 | 4.029 | 2.253 | 1.688 | 0.635 |
| 4090 | 4.520 | 2.744 | 1.847 | 0.794 |
| 0 | 2.482 | 0.706 | 1.345 | 0.292 |

Figure 8G:
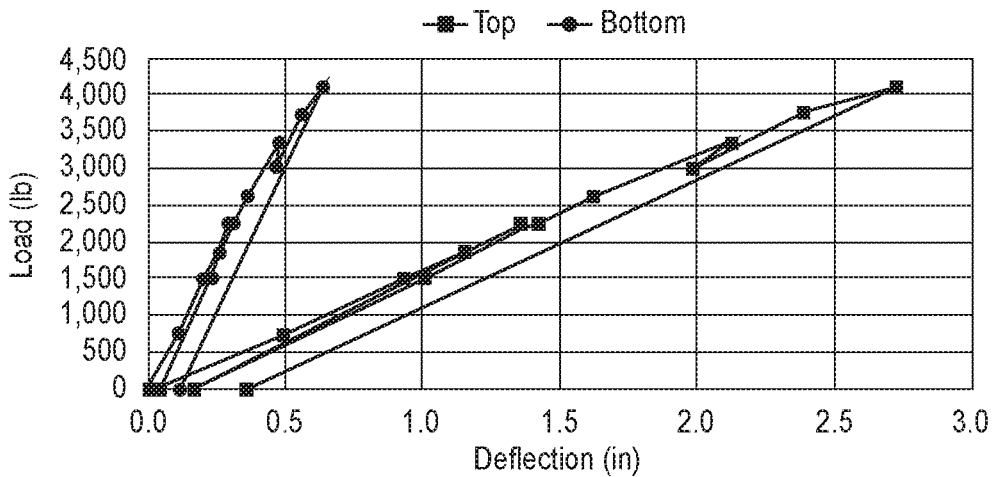
FIG. 8G is a line graph depicting the lateral deflection of Pier 7 in the load testing of the Example, according to one embodiment.

Table 9 below sets forth the results of the lateral load test of Pier 7, which was a standard wide flange pier driven to a depth of 5.5 feet. Further, FIG. 8G depicts a line graph showing the deflection of Pier 7.

TABLE 9

Lateral Load Test - Pier 7

| Pile Number: | | 7 | Tested by: PR | |
|---|---|---|---|---|
| Ground surface Condition: | | Grass | File Size: Wide Flange Beam | |
| Height of top of pile from ground surface | | | 61.25 in | |
| Height of pull chain above ground surface | | | 61.25 in | |
| Height of top measurement | | | 60.75 in | |
| Height of bottom measurement | | | 6 in | |
| Pile Driven Depth | | | 5.5 ft | |

STABILIZED READING

| LOAD (lbs) | Top of Pile Reading | Top of Pile Detection | Bottom of Pile Reading | Bottom of Pile Detection |
|---|---|---|---|---|
| 0 | 1.626 | 0.000 | 1.427 | 0.000 |
| 750 | 2.114 | 0.488 | 1.533 | 0.106 |
| 1500 | 2.549 | 0.923 | 1.625 | 0.198 |
| 1880 | 2.775 | 1.149 | 1.681 | 0.254 |
| 2250 | 2.991 | 1.365 | 1.723 | 0.296 |
| 0 | 1.789 | 0.163 | 1.470 | 0.043 |
| 1500 | 2.627 | 1.001 | 1.653 | 0.226 |
| 2270 | 3.042 | 1.416 | 1.743 | 0.316 |
| 2620 | 3.246 | 1.820 | 1.788 | 0.361 |
| 3360 | 3.750 | 2.124 | 1.907 | 0.430 |
| 3010 | 3.612 | 1.986 | 1.891 | 0.464 |
| 3730 | 4.007 | 2.381 | 1.985 | 0.558 |
| 4120 | 4.350 | 2.724 | 2.066 | 0.639 |
| 0 | 1.986 | 0.360 | 1.540 | 0.113 |

Figure 8H:
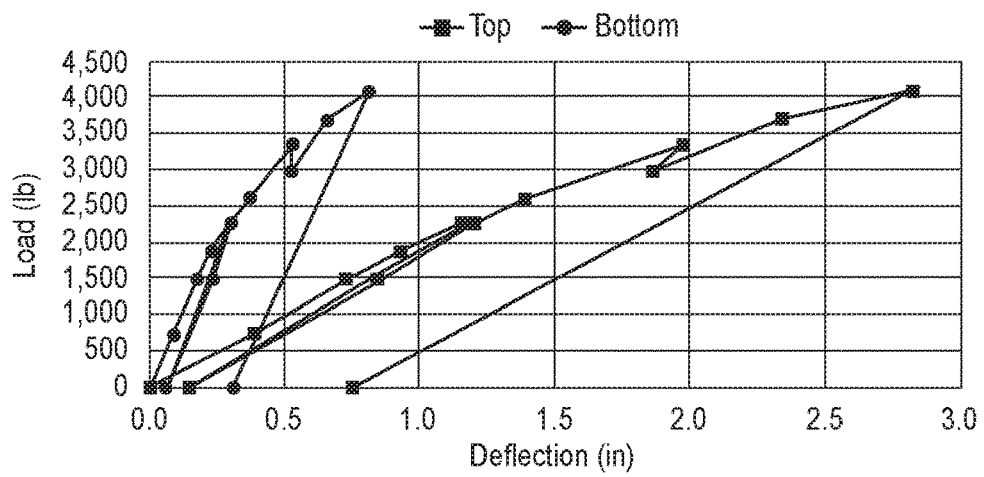
FIG. 8H is a line graph depicting the lateral deflection of Pier 8 in the load testing of the Example, according to one embodiment.

Table 10 below sets forth the results of the lateral load test of Pier 8, which was an acute Z-shaped pier driven to a depth of 5.5 feet. Further, FIG. 8H depicts a line graph showing the deflection of Pier 8.

TABLE 10

Lateral Load Test - Pier 8

| Pile Number: | | 8 | Tested by: PR | |
|---|---|---|---|---|
| Ground surface Condition: | | Grass | Pile Size: Stabilized Z | |
| Height of top of pile from ground surface | | | 62.75 | |
| Height of pull chain above ground surface | | | 62.75 | |
| Height of top measurement | | | 60.75 in | |
| Height of bottom measurement | | | 6 in | |
| Pile Driven Depth | | | 5.5 ft | |

STABILIZED READING

| LOAD (lbs) | Top of Pile Reading | Top of Pile Detection | Bottom of Pile Reading | Bottom of Pile Detection |
|---|---|---|---|---|
| 0 | 1.244 | 0.000 | 1.605 | 0.000 |
| 750 | 1.636 | 0.392 | 1.705 | 0.100 |
| 1500 | 1.974 | 0.730 | 1.785 | 0.180 |
| 1880 | 2.178 | 0.934 | 1.833 | 0.228 |
| 2260 | 2.398 | 1.152 | 1.901 | 0.296 |
| 0 | 1.388 | 0.144 | 1.668 | 0.063 |
| 1510 | 2.091 | 0.847 | 1.840 | 0.235 |
| 2270 | 2.440 | 1.196 | 1.914 | 0.309 |
| 2620 | 2.629 | 1.385 | 1.972 | 0.387 |
| 3360 | 3.217 | 1.973 | 2.139 | 0.534 |
| 2990 | 3.105 | 1.861 | 2.131 | 0.526 |
| 3700 | 3.582 | 2.338 | 2.263 | 0.658 |
| 4090 | 4.068 | 2.824 | 2.420 | 0.815 |
| 0 | 2.000 | 0.756 | 1.919 | 0.314 |

Figure 8I:
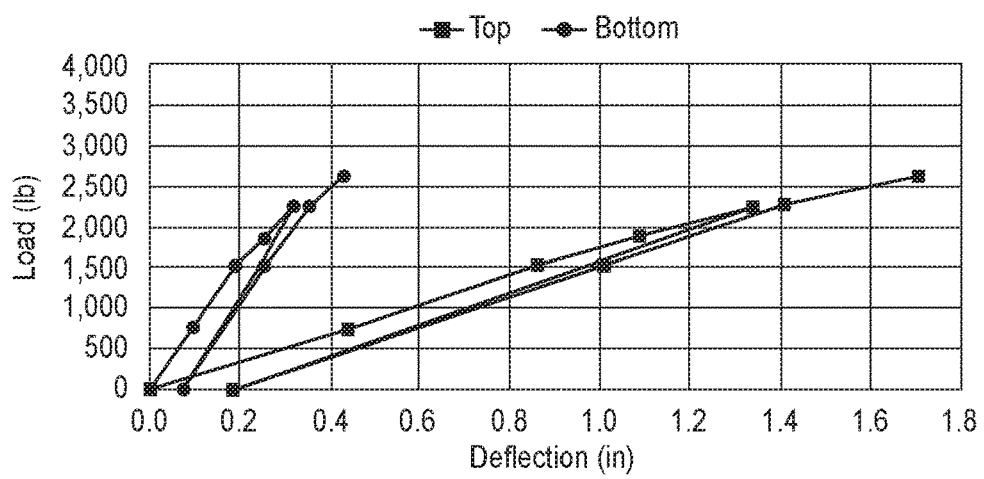
FIG. 8I is a line graph depicting the lateral deflection of Pier 9 in the load testing of the Example, according to one embodiment.

Table 11 below sets forth the results of the lateral load test of Pier 9, which was a standard wide flange pier driven to a depth of 5 feet. Further, FIG. 8I depicts a line graph showing the deflection of Pier 9.

TABLE 11

Lateral Load Test - Pier 9

| Pile Number: | 9 | Tested by: PR |
|---|---|---|
| Ground surface Condition: | Grass | Pile Size: Wide Flange Beam |
| Height of top of pile from ground surface | | 61.5 in" |
| Height of pull chain above ground surface | | 61.5 in" |
| Height of top measurement | | 60.75 in |
| Height of bottom measurement | | 6 in |
| Pile Driven Depth | | 5 ft |

STABILIZED READING

| LOAD (lbs) | Top of Pile Reading | Top of Pile Detection | Bottom of Pile Reading | Bottom of Pile Detection |
|---|---|---|---|---|
| 0 | 2.404 | 0.000 | 1.319 | 0.000 |
| 740 | 2.840 | 0.436 | 1.411 | 0.092 |
| 1510 | 3.260 | 0.856 | 1.512 | 0.193 |
| 1870 | 3.488 | 1.084 | 1.573 | 0.254 |
| 2240 | 3.741 | 1.337 | 1.642 | 0.323 |
| 0 | 2.587 | 0.183 | 1.391 | 0.072 |
| 1530 | 3.410 | 1.006 | 1.574 | 0.255 |
| 2260 | 3.811 | 1.407 | 1.671 | 0.352 |
| 2620 | 4.107 | 1.703 | 1.750 | 0.431 |
| 3375 | Failure | | | |

Figure 8J:
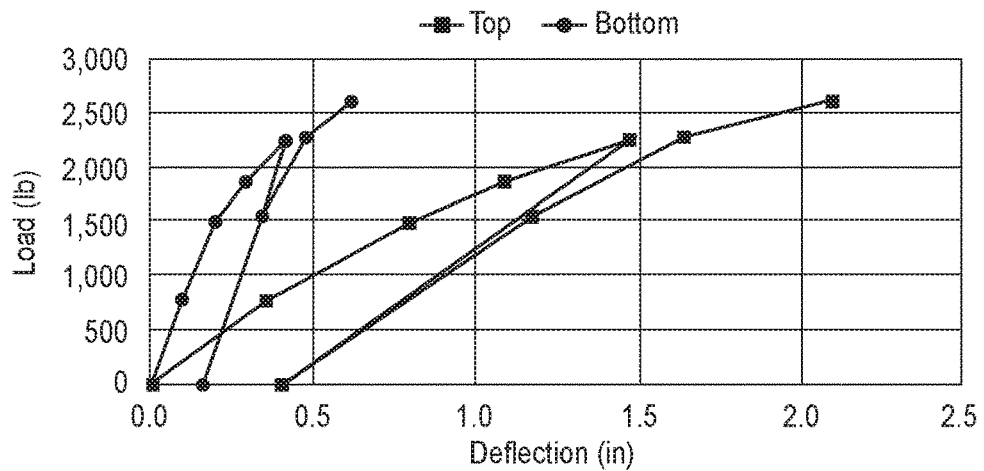
FIG. 8J is a line graph depicting the lateral deflection of Pier 10 in the load testing of the Example, according to one embodiment.

Table 12 below sets forth the results of the lateral load test of Pier 10, which was an acute Z-shaped pier driven to a depth of 5 feet. Further, FIG. 8J depicts a line graph showing the deflection of Pier 10.

TABLE 12

Lateral Load Test - Pier 10

| Pile Number: | 10 | Tested by: PR |
|---|---|---|
| Ground surface Condition: | Grass | Pile Size: Stabilized Z |
| Height of top of pile from ground surface | | 62.25 |
| Height of pull chain above ground surface | | 62.25 |
| Height of top measurement | | 60.75 in |
| Height of bottom measurement | | 6 in |
| Pile Driven Depth | | 5 t |

STABILIZED READING

| LOAD (lbs) | Top of Pile Reading | Top of Pile Detection | Bottom of Pile Reading | Bottom of Pile Detection |
|---|---|---|---|---|
| 0 | 1.523 | 0.000 | 0.557 | 0.000 |
| 770 | 1.881 | 0.358 | 0.648 | 0.001 |
| 1400 | 2.316 | 0.793 | 0.763 | 0.206 |
| 1860 | 2.614 | 1.091 | 0.851 | 0.294 |
| 2230 | 2.994 | 1.471 | 0.973 | 0.416 |
| 0 | 1.927 | 0.404 | 0.719 | 0.162 |
| 1550 | 2.695 | 1.172 | 0.901 | 0.344 |
| 2260 | 3.162 | 1.639 | 1.031 | 0.474 |
| 2600 | 3.616 | 2.093 | 1.176 | 0.619 |
| Failure | | | | |

Figure 8K:
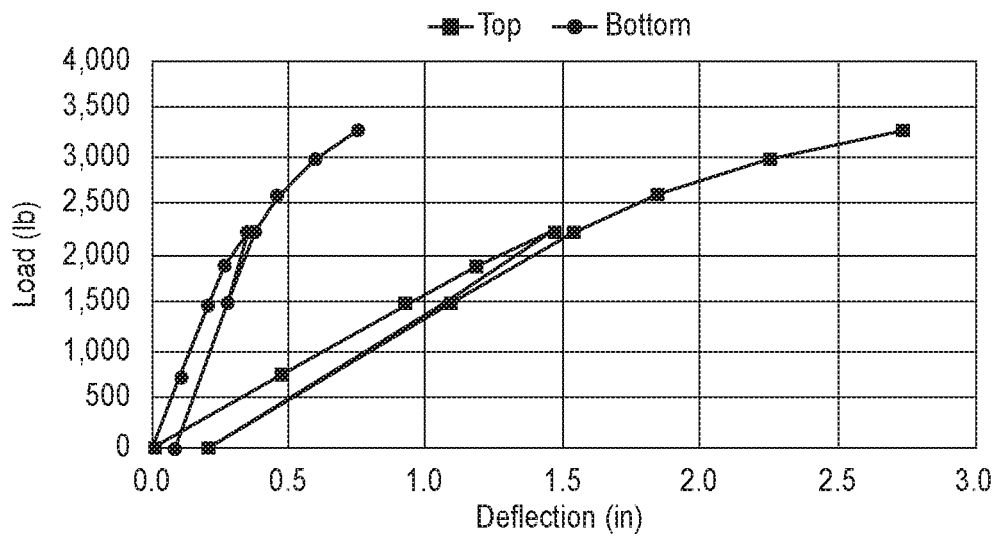
FIG. 8K is a line graph depicting the lateral deflection of Pier 11 in the load testing of the Example, according to one embodiment.

Table 13 below sets forth the results of the lateral load test of Pier 11, which was a standard wide flange pier driven to a depth of 5 feet. Further, FIG. 8K depicts a line graph showing the deflection of Pier 11.

TABLE 13

Lateral Load Test - Pier 11

| Pile Number: | 11 | Tested by: PR |
|---|---|---|
| Ground surface Condition: | Grass | Pile Size: Wide Flange Beam |
| Height of top of pile from ground surface | | 60" |
| Height of pull chain above ground surface | | 60" |
| Haight of top measurement | | 59.5" |
| Height of bottom measurement | | 6 in |
| Pile Driven Depth | | 5 t |

STABILIZED READING

| LOAD (lbs) | Top of Pile Reading | Top of Pile Detection | Bottom of Pile Reading | Bottom of File Detection |
|---|---|---|---|---|
| 0 | 2.350 | 0.000 | 1.158 | 0.000 |
| 750 | 2.813 | 0.463 | 1.258 | 0.100 |
| 1480 | 3.268 | 0.918 | 1.358 | 0.200 |
| 1870 | 3.522 | 1.172 | 1.421 | 0.263 |
| 2230 | 3.816 | 1.466 | 1.505 | 0.047 |
| 0 | 2.547 | 0.197 | 1.232 | 0.074 |
| 1510 | 3.434 | 1.084 | 1.424 | 0.066 |

TABLE 13-continued

| Lateral Load Test - Pier 11 | | | | |
|---|---|---|---|---|
| 2230 | 3.874 | 1.524 | 1.530 | 0.372 |
| 2600 | 4.181 | 1.831 | 1.606 | 0.448 |
| 2970 | 4.591 | 2.241 | 1.743 | 0.585 |
| 3270 | 5.075 | 2.725 | 1.898 | 0.740 |
| 3750 | Failure | | | |

Figure 8L:
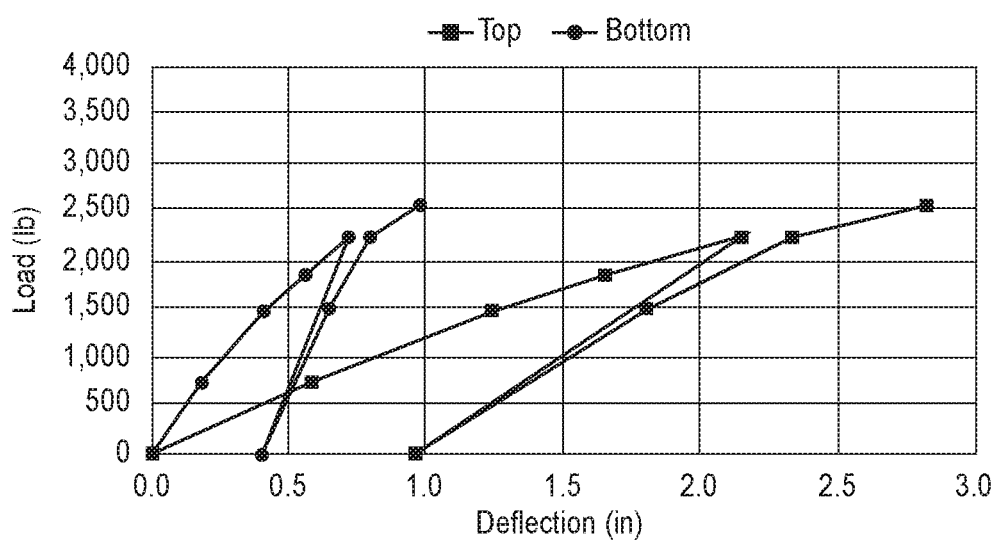
FIG. 8L is a line graph depicting the lateral deflection of Pier 12 in the load testing of the Example, according to one embodiment.

Table 14 below sets forth the results of the lateral load test of Pier 12, which was an acute Z-shaped pier driven to a depth of 5 feet. Further, FIG. 8L depicts a line graph showing the deflection of Pier 12.

TABLE 14

| Lateral Load Test - Pier 12 | | | | |
|---|---|---|---|---|
| Pile Number: | | 12 | Tested by: | PR |
| Ground surface Condition: | | Grass | Pile Size: | Stabilized Z |
| Height of top of pile from ground surface | | | | 62.25 |
| Height of pull chain above ground surface | | | | 62.25 |
| Height of top measurement | | | | 60.75 in |
| Height of bottom measurement | | | | 6 in |
| Pile Driven Depth | | | | 5 t |
| STABILIZED READING | | | | |
| LOAD (lbs) | Top of Pile Reading | Top of Pile Detection | Bottom of Pile Reading | Bottom of Pile Detection |
| 0 | 1.736 | 0.000 | 1.768 | 0.000 |
| 750 | 2.317 | 0.581 | 1.958 | 0.190 |
| 1470 | 2.978 | 1.242 | 2.180 | 0.412 |
| 1850 | 3.383 | 1.647 | 2.326 | 0.558 |
| 2240 | 3.888 | 2.152 | 2.486 | 0.718 |
| 0 | 2.695 | 0.959 | 2.172 | 0.404 |
| 1510 | 3.545 | 1.809 | 2.415 | 0.647 |
| 2240 | 4.068 | 2.330 | 2.565 | 0.797 |
| 2570 | 4.563 | 2.827 | 2.738 | 0.970 |
| 3375 | Failure | | | |

Based on the load testing, the acute Z-shaped pier (called "Stabilized Z" in the tables and figures relating to the testing) has a similar or better deflection response when compared to the standard wide flange pier under lateral loading at the embedment depths of 5.5 and 6 feet. As a result, the acute Z-shaped pier may provide cost savings as a result of being lighter and slightly shorter in comparison to the standard wide flange pier while maintaining the same or better deflection response. For the piers tested at 5 feet of embedment, all four piers (both the acute Z-shaped and standard wide flange piers) exhibited excessive deflections at lower loads. It is expected that for most tracker designs, however, foundation embodiments will be greater than 5 feet, because, for typical tracker loads, there are very few sites where the soils are strong enough to resist the loads while also being soft enough to be drivable.

Although the disclosure has been described with reference to preferred embodiments, persons skilled in the art will recognize that changes may be made in form and detail without departing from the spirit and scope of the disclosed apparatus, systems and methods.

What is claimed is:

1. A vertical support structure comprising:
   (a) an elongate central strut;
   (b) a first flange coupled to an elongate first side of the central strut, wherein a first angle between the first flange and the central strut is acute;
   (c) a second flange coupled to an elongate second side of the central strut, wherein a second angle between the second flange and the central strut is acute;
   (d) a shear center disposed at a cross-sectional centerpoint of a mass of the structure; and
   (e) at least one rib defined in the elongate strut.

2. The vertical support structure of claim 1, further comprising an attachment feature defined in each of the first and second flanges.

3. The vertical support structure of claim 2, wherein the attachment feature comprises at least one opening.

4. The vertical support structure of claim 2, wherein the attachment feature is coupleable to a solar panel.

5. The vertical support structure of claim 1, further comprising a neutral axis disposed at the cross-sectional centerpoint and oriented in an identical direction as an expected lateral load applied to the structure.

6. The vertical support structure of claim 1, wherein the first flange comprises a first angled end segment extending therefrom, and wherein the second flange comprises a second angled end segment extending therefrom.

7. A solar array support structure comprising:
   (a) an elongate central strut comprising at least one support structure;
   (b) a first flange coupled at a first acute angle to an elongate first side of the central strut;
   (c) a second flange coupled at a second acute angle to an elongate second side of the central strut; and
   (d) a neutral axis disposed at a cross-sectional centerpoint of a mass of the structure and oriented in an identical direction as an expected lateral load,
   wherein the at least one support structure comprises a rib.

8. The solar array support structure of claim 7, wherein the central strut and the first and second flanges form a Z-shaped cross-section.

9. The solar array support structure of claim 7, further comprising at least one attachment feature defined in each of the first and second flanges.

10. The solar array support structure of claim 9, wherein the at least one attachment feature comprises at least one opening coupleable to a solar panel.

11. The solar array support structure of claim 7, further comprising a shear center disposed at the cross-sectional centerpoint.

12. The solar array support structure of claim 7, wherein the first flange comprises a first angled end segment extending therefrom, and wherein the second flange comprises a second angled end segment extending therefrom.

13. The solar array support structure comprising:
   (a) an elongate central strut comprising at least one support structure;
   (b) a first flange coupled at a first acute angle to an elongate first side of the central strut;
   (c) a second flange coupled at a second acute angle to an elongate second side of the central strut; and (d) a neutral axis disposed at a cross-sectional centerpoint of a mass of the structure and oriented in an identical direction as an expected lateral load, wherein the at least one support structure comprises first and second ribs, wherein the first rib extends outward from a first surface of the elongate central strut and the second rib extends outward from a second surface of the elongate central strut.

14. The solar array support structure of claim 13, wherein the central strut and the first and second flanges form a Z-shaped cross-section.

15. The solar array support structure of claim 13, further comprising at least one attachment feature defined in each of the first and second flanges.

16. The solar array support structure of claim 15, wherein the at least one attachment feature comprises at least one opening coupleable to a solar panel.

17. The solar array support structure of claim 13, further comprising a shear center disposed at the cross-sectional centerpoint.

18. The solar array support structure of claim 13, wherein the first flange comprises a first angled end segment extending therefrom, and wherein the second flange comprises a second angled end segment extending therefrom.

* * * * *